(12) United States Patent
Ye et al.

(10) Patent No.: US 9,837,918 B2
(45) Date of Patent: Dec. 5, 2017

(54) CONVERTER CIRCUIT WITH A SWITCHABLE TOPOLOGY AND METHOD OF CONVERTING POWER

(71) Applicant: Delta Electronics (Shanghai) Co., Ltd., Shanghai (CN)

(72) Inventors: Yi-Qing Ye, Shanghai (CN); Chao Yan, Shanghai (CN); Li-Ping Sun, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 92 days.

(21) Appl. No.: 14/474,179

(22) Filed: Aug. 31, 2014

(65) Prior Publication Data

US 2015/0062971 A1    Mar. 5, 2015

(30) Foreign Application Priority Data

Sep. 5, 2013  (CN) .......................... 2013 1 0401476

(51) Int. Cl.
  *H02M 3/335*  (2006.01)
  *H02M 3/337*  (2006.01)
  *H02M 1/00*   (2006.01)

(52) U.S. Cl.
  CPC ...... *H02M 3/33569* (2013.01); *H02M 3/3353* (2013.01); *H02M 3/3376* (2013.01); *H02M 2001/0032* (2013.01); *H02M 2001/0054* (2013.01); *Y02B 70/1433* (2013.01); *Y02B 70/1491* (2013.01); *Y02B 70/16* (2013.01)

(58) Field of Classification Search
  CPC .......... H02M 3/33569; H02M 3/3376; H02M 2001/0054; H02M 2001/0032; H02M 3/3353; Y02B 70/1491; Y02B 70/1433; Y02B 70/16

USPC ... 363/15, 17, 20, 21.02, 40, 41, 59, 60, 98, 363/120, 132
See application file for complete search history.

(56) References Cited

U.S. PATENT DOCUMENTS

| | | | |
|---|---|---|---|
| 4,445,049 A | 4/1984 | Steigerwald | |
| 5,406,468 A * | 4/1995 | Booth | H02M 3/33507 363/15 |

(Continued)

FOREIGN PATENT DOCUMENTS

| | | |
|---|---|---|
| CN | 101071948 A | 11/2007 |
| CN | 102611348 A | 7/2012 |

(Continued)

*Primary Examiner* — Alex Torres-Rivera
(74) *Attorney, Agent, or Firm* — CKC & Partners Co., Ltd.

(57) ABSTRACT

A converter circuit includes an inverter and a controller. The inverter is configured to receive an input voltage and to convert the input voltage into a primary-side alternating-current (AC) voltage in a first inversion mode or a second inversion mode. Each of a first switch unit and a second switch unit in the inverter includes switches. When the converter circuit works in the first inversion mode, the controller controls switches of the first switch unit and the second switch unit to cooperatively switch on and switch off periodically according to an output voltage corresponding to the primary-side AC voltage. When the converter circuit works in the second inversion mode, the controller controls the first switch unit to operate independently, in which the switches of the first switch unit switch on and switch off periodically.

24 Claims, 23 Drawing Sheets

(56) References Cited

U.S. PATENT DOCUMENTS

| | | | | |
|---|---|---|---|---|
| 2008/0247194 A1* | 10/2008 | Ying | ................... | H02M 3/3376 363/17 |
| 2009/0085543 A1* | 4/2009 | Sigamani | ............ | H02M 3/3376 323/282 |
| 2011/0103097 A1* | 5/2011 | Wang | ................ | H02M 3/33592 363/17 |
| 2014/0036545 A1* | 2/2014 | Reddy | ................. | H02M 3/3376 363/17 |
| 2014/0119060 A1* | 5/2014 | Zhu | ...................... | H02M 3/337 363/17 |

FOREIGN PATENT DOCUMENTS

| | | |
|---|---|---|
| CN | 102835011 A | 12/2012 |
| CN | 103066854 A | 4/2013 |
| JP | 10-136653 | 5/1998 |
| JP | 2003-324956 | 11/2003 |
| JP | 2006-158137 A | 6/2006 |
| TW | 201316672 A | 4/2013 |

* cited by examiner

CONVERTER CIRCUIT WITH A SWITCHABLE TOPOLOGY AND METHOD OF CONVERTING POWER

RELATED APPLICATIONS

This application claims priority to China Patent Application Serial Number 201310401476.1, filed Sep. 5, 2013, which is herein incorporated by reference.

BACKGROUND

Technical Field

The present disclosure relates to a converter circuit. More particularly, the present disclosure relates to a converter circuit with a switchable topology.

Description of Related Art

A conventional power system includes a first converter and a second converter connected in cascade. For example, the first converter is an AC-to-DC converter, and the second converter can be a point of load (POL). An AC power is transformed by the AC-to-DC converter, and then the transformed DC power is further converted by multiple POLs into lower DC voltages for various electronic devices.

For satisfying optimal requirement of the system performance or decreasing system loss, in some specific conditions (e.g., small power condition), the system regulates the output of the AC-to-DC converter to a lower level, so as to improve efficiency of the POL corresponding to the second converter, but the output of the AC-to-DC converter is not regulated to be too low, to further maintain the high efficiency of the entire system.

For example, when the system operates with a heavier load (e.g., the output is provided for a load between a half load and a full load), the output of the AC-to-DC converter is 12 Volts; when the system operates with a lighter load (e.g., the output current is smaller), the efficiency of the POL corresponding to the second converter would decrease if the output of the AC-to-DC converter is maintained 12 Volts, such that the efficiency of the entire system decreases accordingly. If, at the moment, the output of the AC-to-DC converter is decreased, for example, to be 6 Volts, then the efficiency of the POL corresponding to the second converter would increase. As a result, by changing the output of the AC-to-DC converter at different states, the efficiency of the entire system is higher compared to the approach of maintaining the output of the AC-to-DC converter, although its efficiency would change accordingly (e.g., the efficiency of the converter would decrease when the output of the AC-to-DC converter is decreased). In addition, in some applications, e.g., a charging system of an electric car, it requires that its converter generate different output voltages in different situations because, for different electric cars, model numbers of batteries are different and thus their charging voltages are different. As a result, for satisfying charging demands of various electric cars, output voltages of present charging equipments usually have a broader range (e.g., 150 V-450 V), so as to meet the demands of the aforementioned applications by changing the output of the converter.

For a pulse width modulation (PWM) converter, the gain of the converter can be decreased by decreasing the output voltage, and for example, decreasing the output voltage can be realized by reducing the duty cycle of the switches in the converter. For a resonant converter, the gain of the converter can be decreased by changing the operating frequency of the switches in the converter. For a series resonant circuit, e.g., a LLC series resonant converter, increasing the operating frequency can decrease the gain.

However, regardless of the type of the converter topology, the decreased gain usually corresponds to an increase of circuit loss and an efficiency decrease of the converter. Therefore, even if the post-stage converter has an enhanced efficiency due to the decrease of the output voltage of the previous-stage converter, the efficiency of the entire system still cannot be significantly improved.

SUMMARY

An aspect of the present disclosure is related to a converter circuit. The converter circuit includes an inverter and a controller. The inverter is configured to receive an input voltage. The inverter is configured to transform the input voltage into a primary-side alternating-current (AC) voltage in a first inversion mode or a second inversion mode. The inverter includes a first switch unit and a second switch unit. The first switch unit includes a plurality of switches. The second switch unit includes a plurality of switches. When the converter circuit is operated in the first inversion mode, the controller is configured to control the switches of the first switch unit and the second switch unit to cooperatively switch on and switch off periodically according to an output voltage corresponding to the primary-side AC voltage. When the converter circuit is operated in the second inversion mode, the controller is configured to control the first switch unit to operate independently and the switches of the first switch unit switch on and switch off periodically. A voltage gain of the converter circuit in the first inversion mode is different from a voltage gain of the converter circuit in the second inversion mode.

Another aspect of the present disclosure is related to method of converting power by a converter circuit. The inverter includes a first switch unit and a second switch unit, and the first switch unit and the second switch unit includes a plurality of switches. The method includes following operations. The first switch unit and the second switch unit perform operations corresponding to a first inversion mode or a second inversion mode, such that the converter circuit converts an input voltage into an output voltage. When the converter circuit is operated in the first inversion mode, switches of the first switch unit and the second switch unit cooperatively switch on and switch off periodically, and when the converter circuit is operated in the second inversion mode, the first switch unit operates independently and the switches of the first switch unit switch on and switch off periodically. A gain associated with the output voltage and the input voltage is adjusted, such that a voltage value corresponding to the output voltage approaches or is equal to a first given voltage value. An operation is switched between the first inversion mode and the second inversion mode, such that the first switch unit and the second switch unit perform operations corresponding to the first inversion mode or the second inversion mode, and the voltage value corresponding to the output voltage approaches or is equal to a second given voltage value, and the first given voltage value is configured to approach or be equal to the second given voltage value.

Still another aspect of the present disclosure is related to a converter circuit. The converter circuit includes an inverter, a transformer, a rectifier and a controller. The inverter includes a first switch unit including a plurality of switches, and the inverter is configured to receive an input voltage and configured to transform the input voltage into a primary-side alternating-current (AC) voltage. The transformer includes a primary-side winding and a secondary-side winding, and the primary-side winding is configured to receive the primary-side AC voltage, and the transformer is configured to transform the primary-side AC voltage into a secondary-side AC voltage. The rectifier is electrically connected to the secondary-side winding of the transformer, and the rectifier is configured to receive the secondary-side AC voltage and configured to transform the secondary-side AC voltage into a direct-current (DC) voltage to generate the output voltage corresponding to the DC voltage. The rectifier includes a third switch unit, a fourth switch unit, a capacitor unit and at least one change-over switch. The third switch unit includes a plurality of switches. The fourth switch unit is electrically connected in parallel to the third switch unit and includes a plurality of switches. The capacitor unit includes a first capacitor and a second capacitor electrically connected in series with each other. The change-over switch is electrically connected to the fourth switch unit and the capacitor unit. The controller is configured to control the switches of the third switch unit and the fourth switch unit, respectively, and the change-over switch, to switch on and switch off, such that the rectifier operates in a first rectification mode or a second rectification mode.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of various embodiments, with reference to the accompanying drawings as follows.

DETAILED DESCRIPTION

Figure 1:
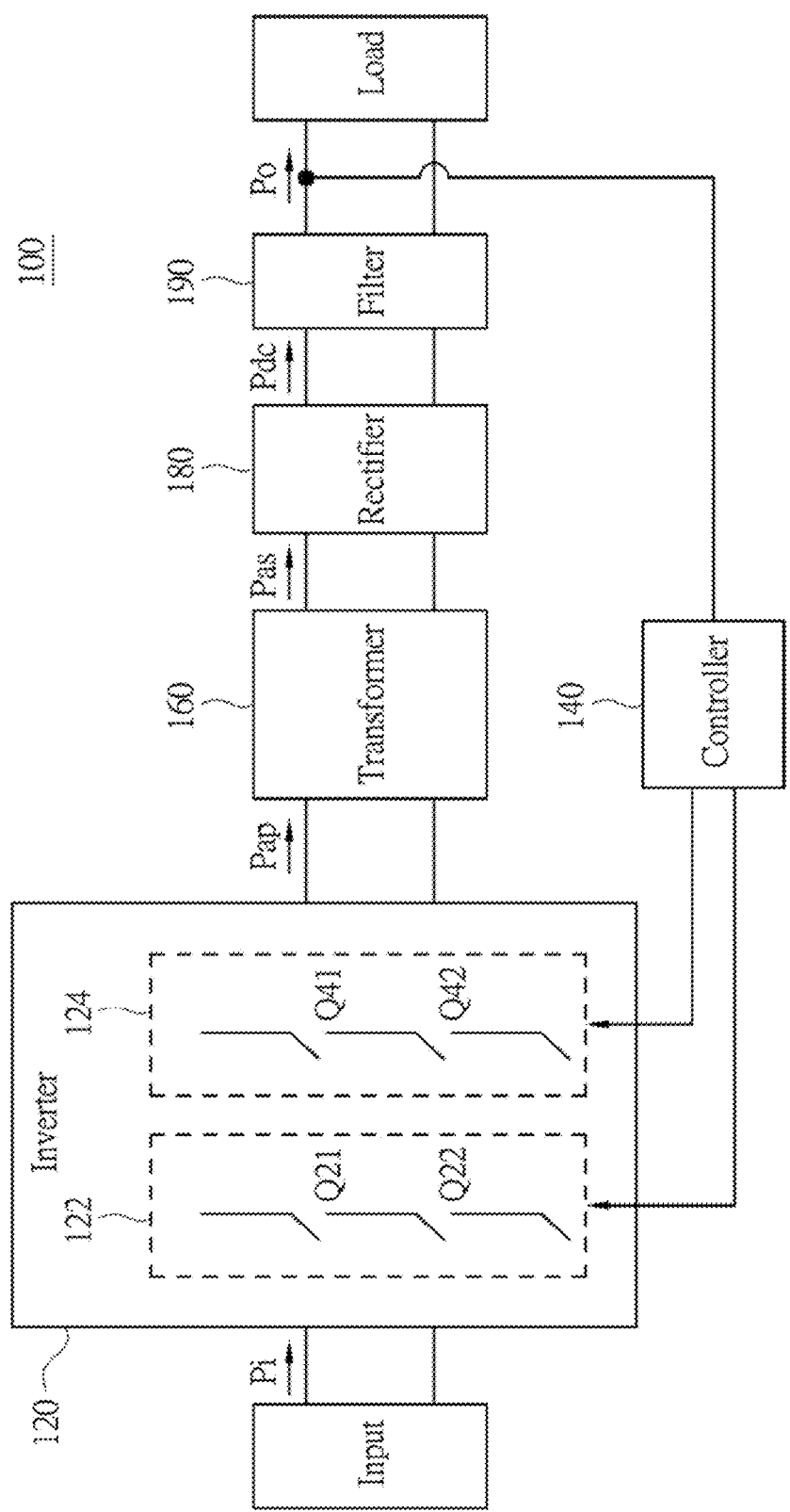
FIG. 1 is a schematic diagram of a converter circuit according to one embodiment of the present disclosure.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

It will be understood that in the present disclosure, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a converter circuit according to one embodiment of the present disclosure. The converter circuit 100 includes an inverter 120 and a controller 140. The inverter 120 is configured to receive an input power Pi and transform the input power Pi into a primary-side alternating-current (AC) power Pap in a first inversion mode or a second inversion mode. The inverter 120 includes a switch unit 122 and a switch unit 124. The switch unit 122 includes switches Q21, Q22, and the switch unit 124 includes switches Q41, Q42.

When the converter circuit 100 works in the first inversion mode, the controller 140 controls the switches Q21, Q22, Q41, Q42 to cooperatively switch on and switch off periodically according to an output power Po corresponding to the primary-side AC power Pap. For example, in a positive half cycle, the switches Q21 and Q42 are switched on and the switches Q22 and Q41 are switched off; in a negative half cycle, the switches Q22 and Q41 are switched on and the switches Q21 and Q42 are switched off.

When the converter circuit 100 works in the second inversion mode, the controller 140 controls the switch unit 122 to operate independently, in which the switches Q21 and Q22 of the switch unit 122 switch on and switch off periodically and do not cooperate with the switches Q41 and Q42 of the switch unit 124. For example, in one cycle, the switch Q41 is "ON" and the switch Q42 is "OFF".

In one embodiment, in the second inversion mode, the controller 140 is further configured to control the switch Q41 to maintain switched on (or switched off) and the switch Q42 to maintain switched off (or switched on), such that the switches Q41 and Q42 stop switching, and when the switches Q21 and Q22 switch on and switch off periodically, the switches Q41 and Q42 maintain their present states. In other words, in the second inversion mode, the operation of the inverter 120 is determined by the switching operations of the switches Q21 and Q22 of the switch unit 122.

As shown in FIG. 1, in one embodiment, the converter circuit 100 includes a transformer 160 and a rectifier 180. The transformer 160 is configured to transform the primary-side AC power Pap into a secondary-side AC power Pas. The rectifier 180 is configured to rectify the secondary-side AC power Pas into a direct-current (DC) power Pdc to generate the output power Po corresponding to the DC power Pdc. The controller 140 is further configured to control an operating frequency or a duty cycle of the switches Q21, Q22, Q41 and Q42 of the switch units 122 and 124, so as to adjust a gain associated with the output power Po and the input power Pi.

Moreover, in one embodiment, the converter circuit 100 includes a filter 190. The filter 190 is electrically connected to the rectifier 180, and configured to stabilize the DC power Pdc to output the output power Po.

Figure 1A:
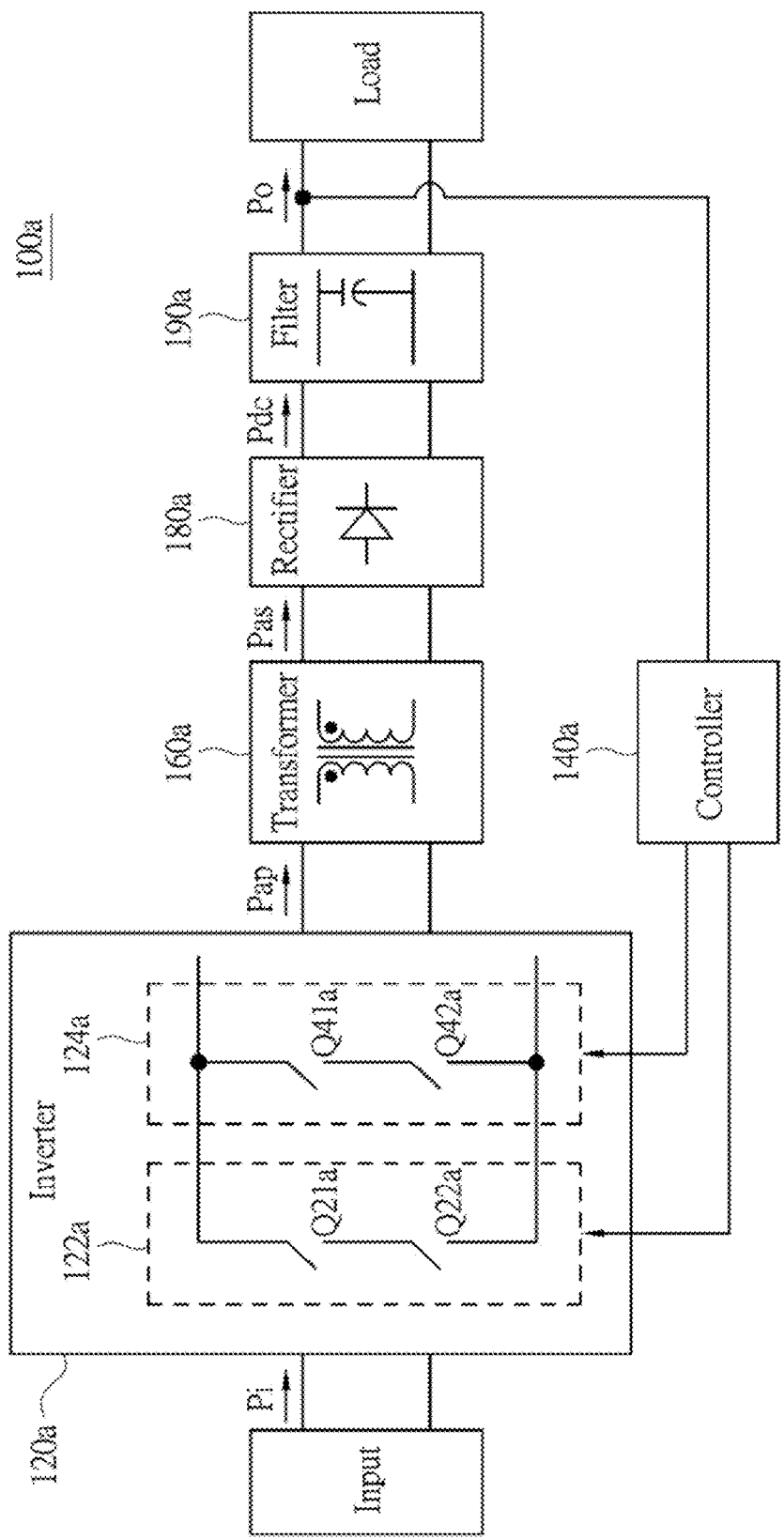
FIG. 1A is a schematic diagram of a topology of a bridge converter circuit according to one embodiment of the present disclosure.

For illustration in FIG. 1A, FIG. 1A is a schematic diagram of a topology of a bridge converter circuit according to one embodiment of the present disclosure. Compared to FIG. 1, the switches Q21a, Q22a of the switch unit 122a are electrically connected in series, and the switches Q41a, Q42a of the switch unit 124a are electrically connected in series (in which the switch unit illustrated in FIG. 1A can also be named as a bridge arm). Each of the switches Q21a, Q22a, Q41a, Q42a can be a metal-oxide-semiconductor field effect transistor (MOSFET), an insulated gate bipolar transistor (IGBT), a thyristor, a diode, etc. Notably, if the filter 190a is applied in a pulse-width-modulation (PWM) bridge converter circuit, the filter 190a includes at least one capacitor and at least one inductor electrically connected in series with each other. If the filter 190a is applied in a resonant bridge converter circuit, the filter 190a performs filtering by at least one capacitor.

Figure 1B:
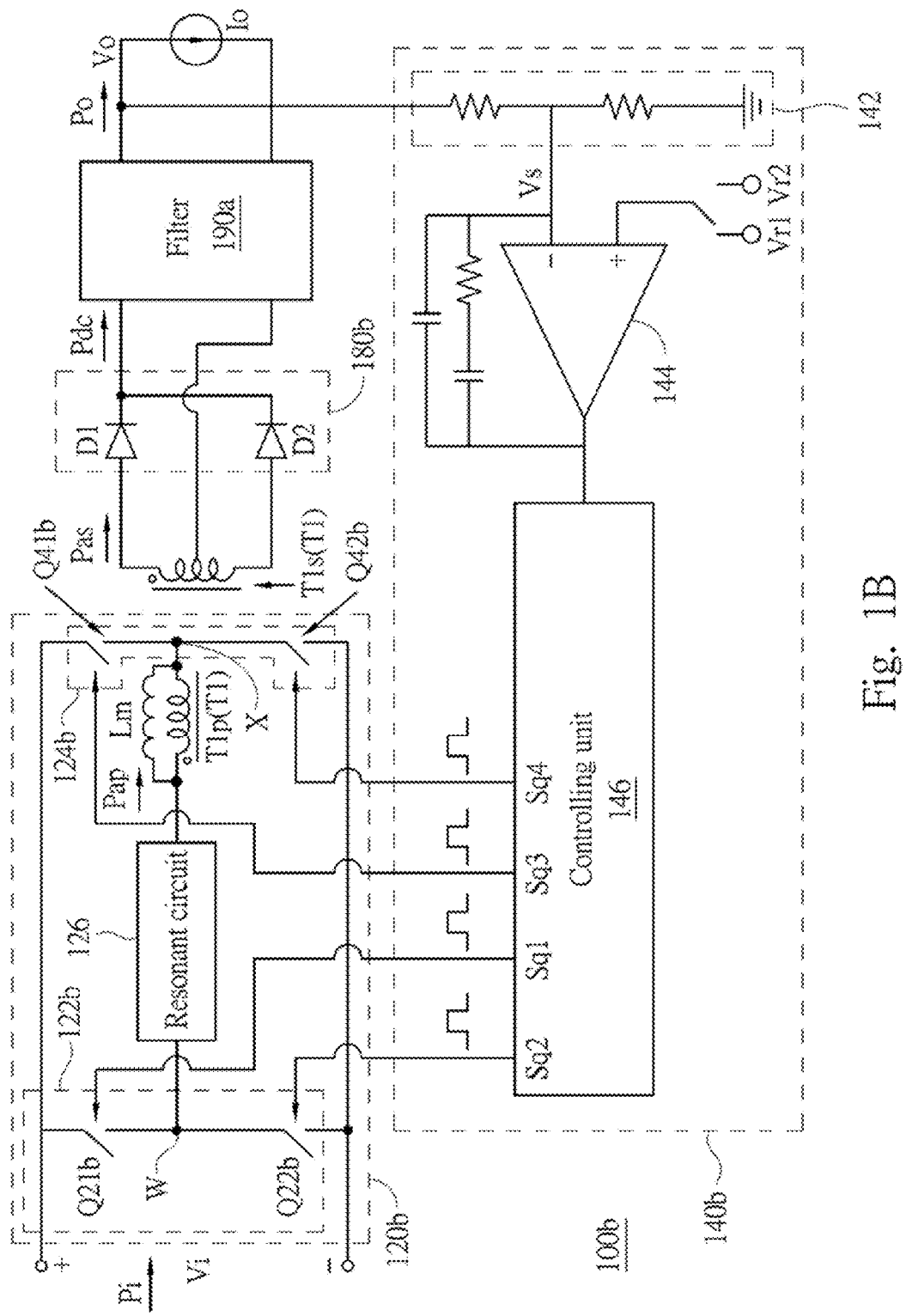
FIG. 1B is a schematic diagram of a topology of a full-bridge converter circuit according to one embodiment of the present disclosure.

Specifically, for illustration in FIG. 1B, FIG. 1B is a schematic diagram of a topology of a full-bridge converter circuit according to one embodiment of the present disclosure. The converter circuit 100b includes an inverter 120b at the primary side, a transformer T1, a rectifier 180b that performs full-wave rectifying, a filter 190b and a controller 140b. The inverter 120b is electrically connected to the transformer T1, the transformer T1 is electrically connected to the rectifier 180b, and rectifier 180b is electrically connected to the filter 190b. The inverter 120b includes switch units 122b, 124b. The switch unit 122b includes switches Q21b, Q22b, and the switch unit 124b includes switches Q41b, Q42b. Functions of the inverter 120b, the transformer T1, the rectifier 180b that performs full-wave rectifying, the filter 190b and the controller 140b are illustrated in the embodiment of FIG. 1, and thus they are not further detailed herein.

In the embodiment illustrated in FIG. 1B, compared to FIG. 1, the switch units 122b, 124b are electrically connected in parallel. The switches Q21b, Q22b are electrically connected in series at a node W. The switches Q41b, Q42b are electrically connected in series at a node X. The transformer T1 includes a primary-side winding T1p and a secondary-side winding T1s, in which the primary-side winding T1p is electrically connected to the node X, and the secondary-side winding T1s is electrically connected to the rectifier 180b. The rectifier 180b includes diodes D1, D2, in which anodes of the diodes D1, D2 are electrically connected to two terminals of the secondary-side winding T1s, respectively, and cathodes of the diodes D1, D2 are electrically connected to each other and to the filter 190b.

Furthermore, compared to FIG. 1A, the controller 140b is further configured to control the switches Q21b, Q22b, Q41b, Q42b to cooperatively transform the input power Pi by a full-bridge converter topology. More specifically, in the controller 140b, a sampler 142 samples the output power Po to generate a sampling voltage Vs. Then, an operational amplifier 144 compares the sampling voltage Vs with a reference voltage Vr1 or compares the sampling voltage Vs with a reference voltage Vr2. Afterwards, a control unit 146 controls the switches Q21b, Q22b, Q41b, Q42b according to the comparison result from the operational amplifier 144. The converter circuit 100b operating in the first inversion mode is switched to operate with the full-bridge converter topology, through the control operation of the controller 140b. In the positive half cycle, the control unit 146 controls the switches Q21b, Q42b to synchronously switch on and switch off, and in the negative half cycle, the control unit 146 controls the switches Q22b, Q41b to synchronously switch on and switch off, so as to transform the input power Pi into the output voltage Vo by the full-bridge converter topology.

Figure 1C:
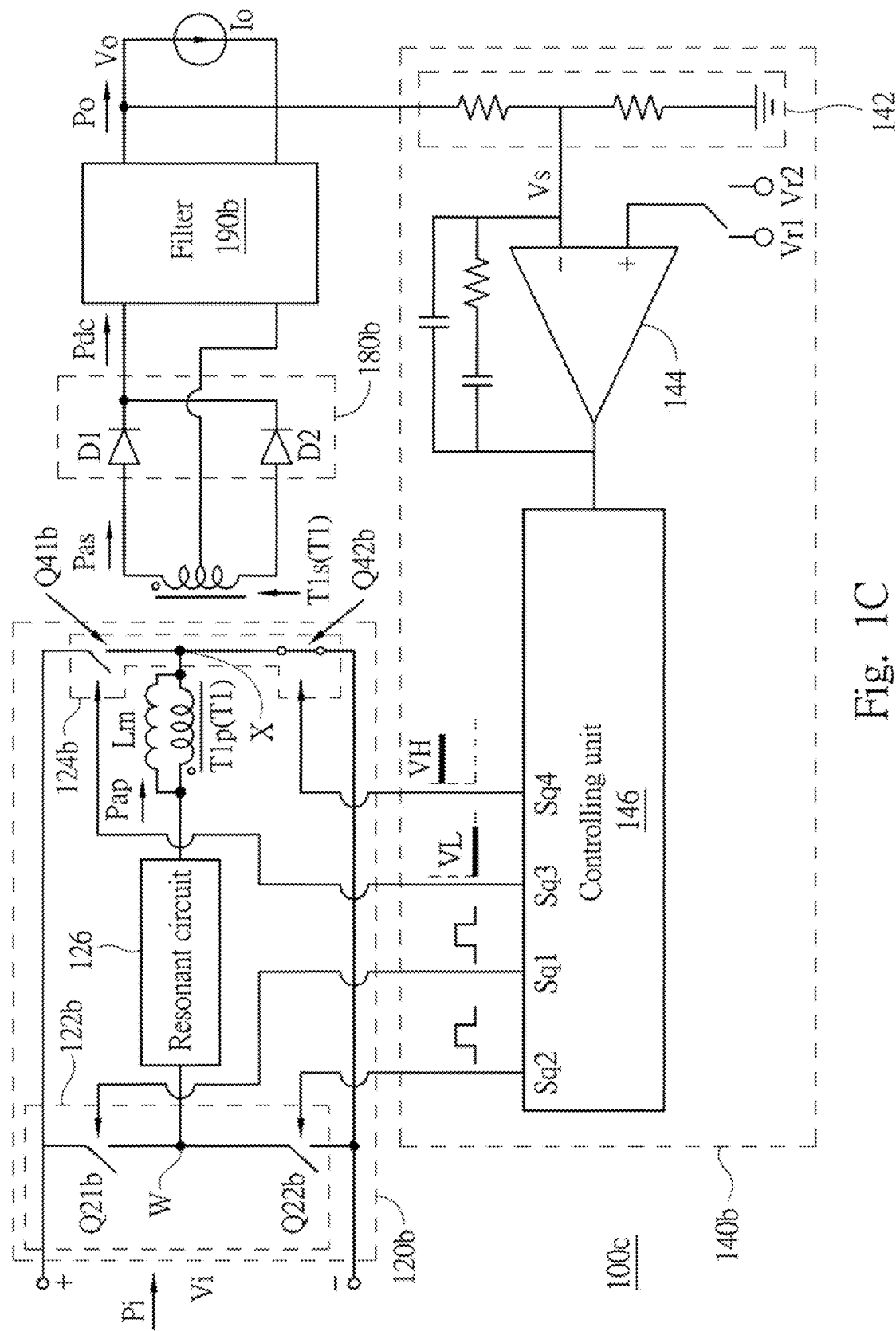
FIG. 1C is a schematic diagram of a topology of a half-bridge converter circuit according to one embodiment of the present disclosure.

In one embodiment, in the second inversion mode, the controller 140b is further configured to control the switches Q21b and Q22b to transform the input power Pi by a half-bridge converter topology. In present embodiment, in the second inversion mode, in one cycle, the controller 140b controls the switch Q41b to maintain switched on or switched off, and the controller 140b controls the switch Q42b to correspondingly maintain switched off or switched on. More specifically, as shown in FIG. 1C, FIG. 1C is a schematic diagram of a topology of a half-bridge converter circuit according to one embodiment of the present disclosure. Compared to FIG. 1B, the converter circuit 100b operating in the second inversion mode is switched to operate with the half-bridge converter topology, through the control operation of the controller 140b. The controller 140b drives the switch Q41b, with a low voltage level VL, to maintain switched off, and at the same time, controls the switch Q42b, with a high voltage level VH, to maintain switched on. At the same time, the controller 140b controls the switches Q21b and Q22b to alternately switch on and switch off, such that the converter circuit 100b operating in the second inversion mode operates with the half-bridge converter topology and the switch unit 124b is maintained at a constant state.

Figure 1D:
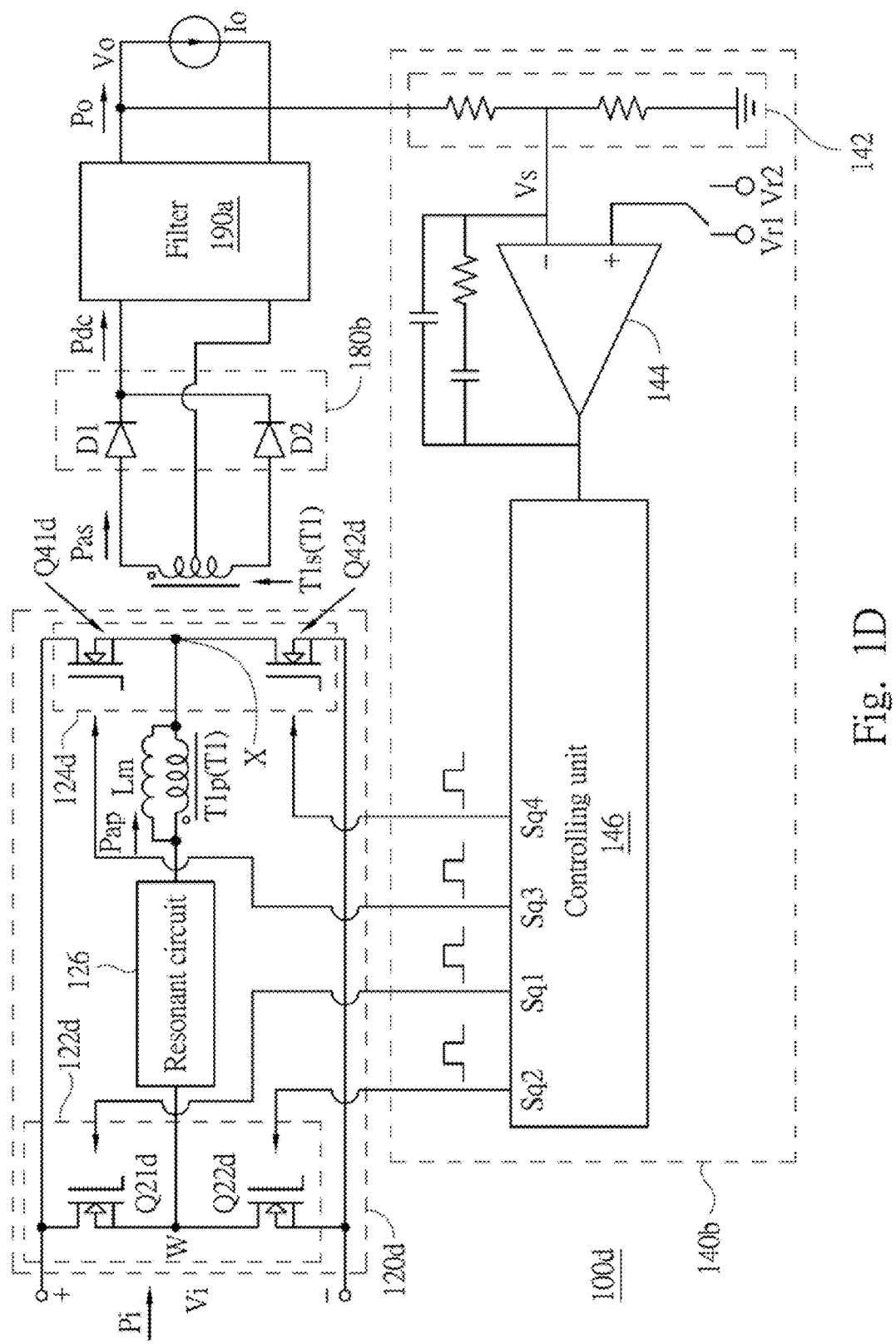
FIG. 1D is a schematic diagram of a converter circuit according to another embodiment of the present disclosure.

Notably, each of the aforementioned switches can be a metal-oxide-semiconductor field effect transistor (MOSFET), an insulated gate bipolar transistor (IGBT), a thyristor, a transistor, etc., or the combination thereof. For illustration in FIG. 1D, FIG. 1D is a schematic diagram of a converter circuit according to another embodiment of the present disclosure. As shown in FIG. 1D, compared to FIG. 1B, the switches Q21d, Q22d, Q41d and Q42d are implemented by MOSFET.

Figure 1E:
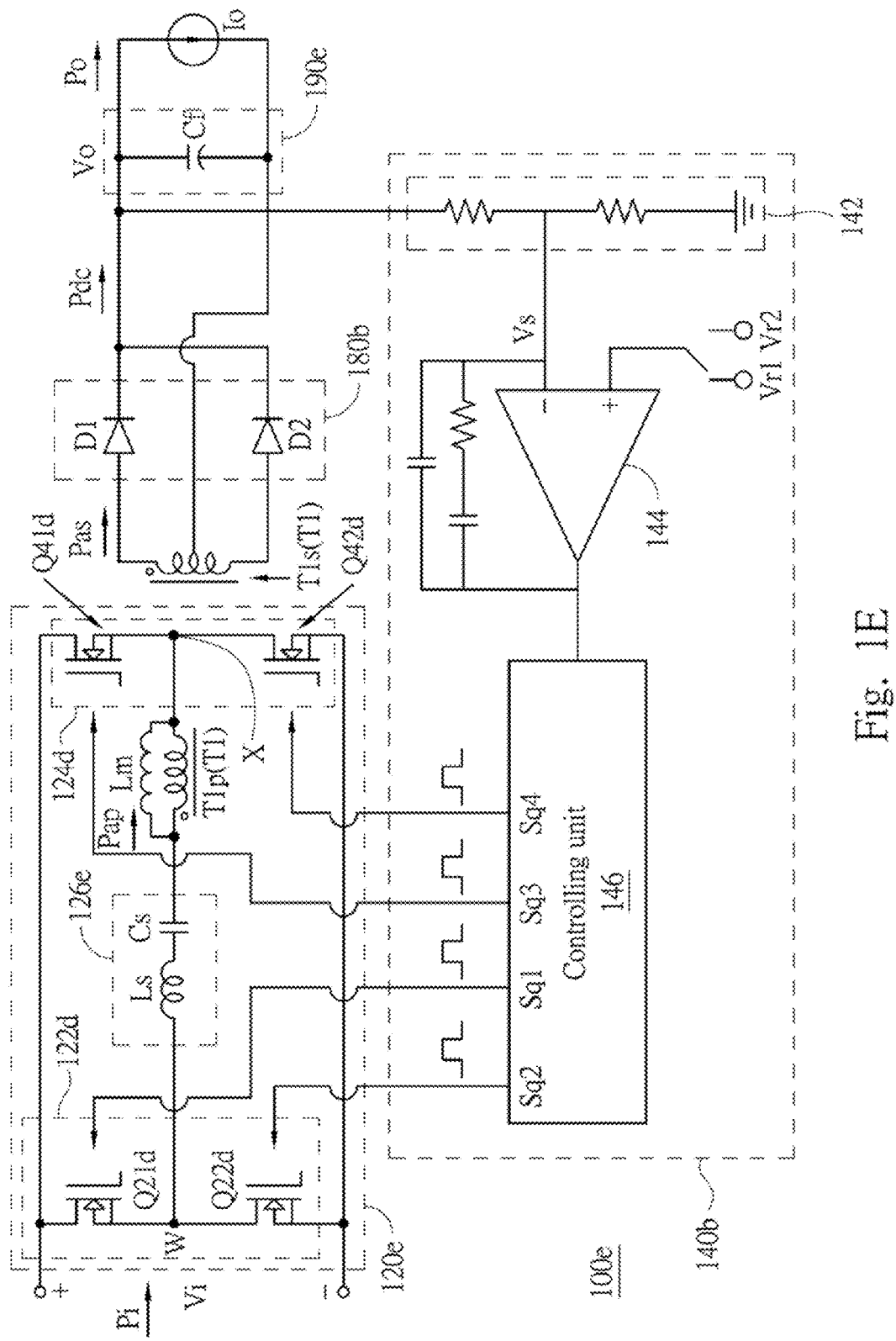
FIG. 1E is a schematic diagram of a converter circuit according to yet another embodiment of the present disclosure.

A specific structure of a resonant converter circuit is described below. For illustration in FIG. 1E, FIG. 1E is a schematic diagram of a converter circuit according to yet another embodiment of the present disclosure. The converter circuit 100e is a LLC series resonant converter circuit. Compared to FIG. 1D, the resonant circuit 126e further includes an inductor Ls and a capacitor Cs, and the capacitor Cs is electrically connected in series to the inductor Ls. Moreover, the filter 190e further includes a capacitor Cf that is electrically connected in parallel with a load.

In the present embodiment, the gain of the converter circuit 100e is adjusted through the controller 140b, in which the gain is a ratio of the output voltage Vo which corresponds to the output power Po, to the input voltage Vi which corresponds to the input power Pi. The manners of adjusting the gain may include adjusting the operating frequency of the switches, the phase shifting manner together with adjusting the operating frequency of the switches, or the phase shift reversed energy through a synchronous rectifier at the secondary side. Furthermore, the control loop of adjusting the gain can perform closed-loop adjusting or open-loop adjusting. In the closed-loop adjusting operation, the reference voltage Vr1 or Vr2 of the converter circuit can be linearly adjusted, starting when the converter topology is switched, or can be stepwise adjusted, or can be adjusted by directly pulling up or pulling down the voltage level.

Figure 1F:
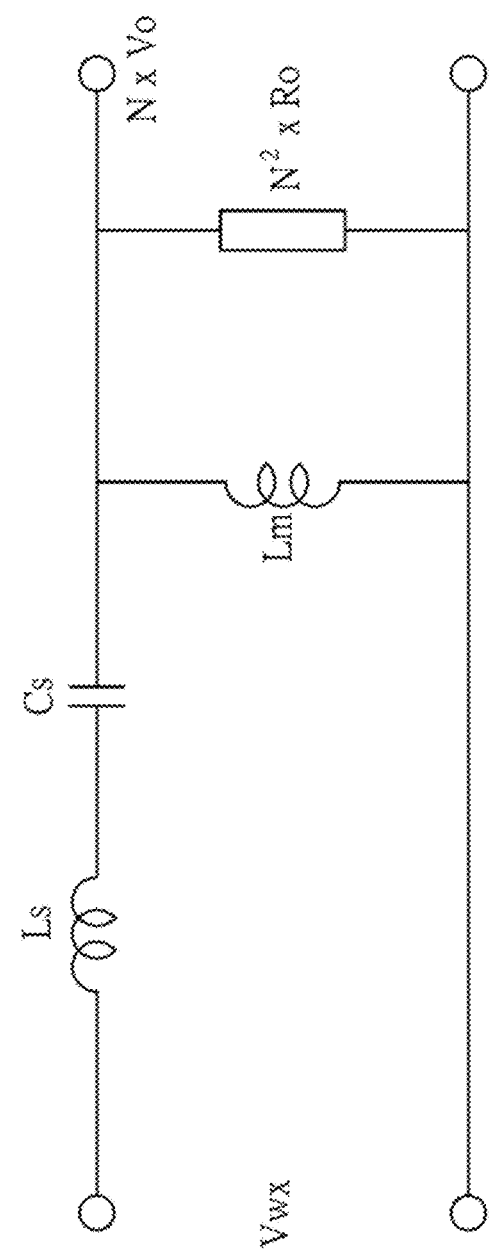
FIG. 1F is a schematic diagram of an equivalent circuit of the converter circuit shown in FIG. 1E.

As shown in FIG. 1E, the converter circuit 100e operates as a full-bridge converter circuit in the first inversion mode, in which the switches Q21d and Q22d of the switch unit 122d switch on with a phase difference of 180 degrees, and the switches Q41d and Q42d of the switch unit 124d switch on with a phase difference of 180 degrees. The diagonal switches of the switch units 122d and 124d are identically driven, and thus the switches Q21d and Q42d switch on or switch off at the same time, and the switches Q22d and Q41d switch on or switch off at the same time. Referring to FIG. 1F, FIG. 1F is a schematic diagram of an equivalent circuit of the converter circuit shown in FIG. 1E, according to one embodiment of the present disclosure. The circuit 10f is an equivalent circuit of the converter circuit 100e which is implemented by the LLC resonant converter circuit, in which Vwx is a cross voltage between the nodes W and X shown in FIG. 1E, Ro is an output impedance, N is a turns ratio of the primary-side winding T1p to the secondary-side winding T1s of the transformer T1. M ($\Omega$, h, Q) is given as a normalized DC gain of the converter circuit, in which $\Omega$, h, Q are variables normalized from circuit parameters, and the output voltage Vo is obtained by the equation Vo=M($\Omega$, h, Q)×Vwx. In the condition that the converter circuit 100e operates as the full-bridge converter circuit in the first inversion mode, the voltage Vwx is equal to the voltage Vi, and in the condition that the converter circuit 100e operates as the half-bridge converter circuit in the second inversion mode, the voltage Vwx is equal to a half of the voltage Vi. Thus, in the condition that the output impedance Ro is not changed and the operating frequencies of the switches are the same, the output voltage Vo of the converter circuit 100e operating in the second inversion mode (the half-bridge converter topology) is a half of the output voltage Vo of the converter circuit 100e operating in the first inversion mode (the full-bridge converter topology).

Operations of the LLC resonant converter circuit are described below with reference to FIG. 1E. When the converter circuit 100e operates in the first inversion mode, the switch units 122d and 124d of the inverter 120e cooperate with each other with the full-bridge converter topology. After the inverter 120e receives the input voltage Vi corresponding to the input power Pi, the switches Q21d, Q22d, Q41d, Q42d cooperatively switch on and switch off periodically, the resonant circuit 126e operates correspondingly and transmits the primary-side AC power Pap to the primary-side winding T1p of the transformer T1. The transformer T1 transfers the primary-side AC power Pap from the primary-side winding T1p to the secondary-side winding T1s to generate the secondary-side AC power Pas. Then, the secondary-side winding T1s transmits the secondary-side AC power Pas to the rectifier 180b. The rectifier 180b rectifies the secondary-side AC power Pas as the DC power Pdc. The filter 190e performs filtering to the DC power Pdc through the capacitor Cf and then generates the output voltage Vo corresponding to the output power Po.

The sampler 142 samples the output voltage Vo to generate the sampling voltage Vs. The operational amplifier 144 compares the sampling voltage Vs with the reference voltage (e.g., the reference voltage Vr1 or Vr2) and generates the control signal for controlling the switches Q21d, Q22d, Q41d, Q42d. The controlling unit 146 adjusts the operating frequencies of the switches Q21d, Q22d, Q41d, Q42d according to the output from the operational amplifier 144, so as to control the switches Q21d, Q22d, Q41d, Q42d such that the gain (obtained by dividing the output voltage Vo by the input voltage Vi) is adjusted, resulting in that the value of the output voltage Vo is adjusted and approaches or is equal to an objective voltage value. When the controller 140b receives a system command of changing the output voltage Vo or the output power Po (or the output voltage Vo) is smaller than a given reference power (or a reference output voltage) (e.g., the reference power can be obtained from a corresponding power value or current), the controller 140*b* controls the converter circuit 100*e* to switch the operation from the first inversion mode (the full-bridge converter topology) to the second inversion mode (the half-bridge converter topology). When the converter circuit 100*e* operates in the second inversion mode, the controller 140*b* controls the switch Q41*d* of the switch unit 124*d* to switch off and the switch Q42*d* of the switch unit 124*d* to switch on, and the switch unit 122*d* operates with the half-bridge converter topology (e.g., the switches Q21*d* and Q22*d* alternately switch on and switch off periodically) at the same time.

Figure 2:
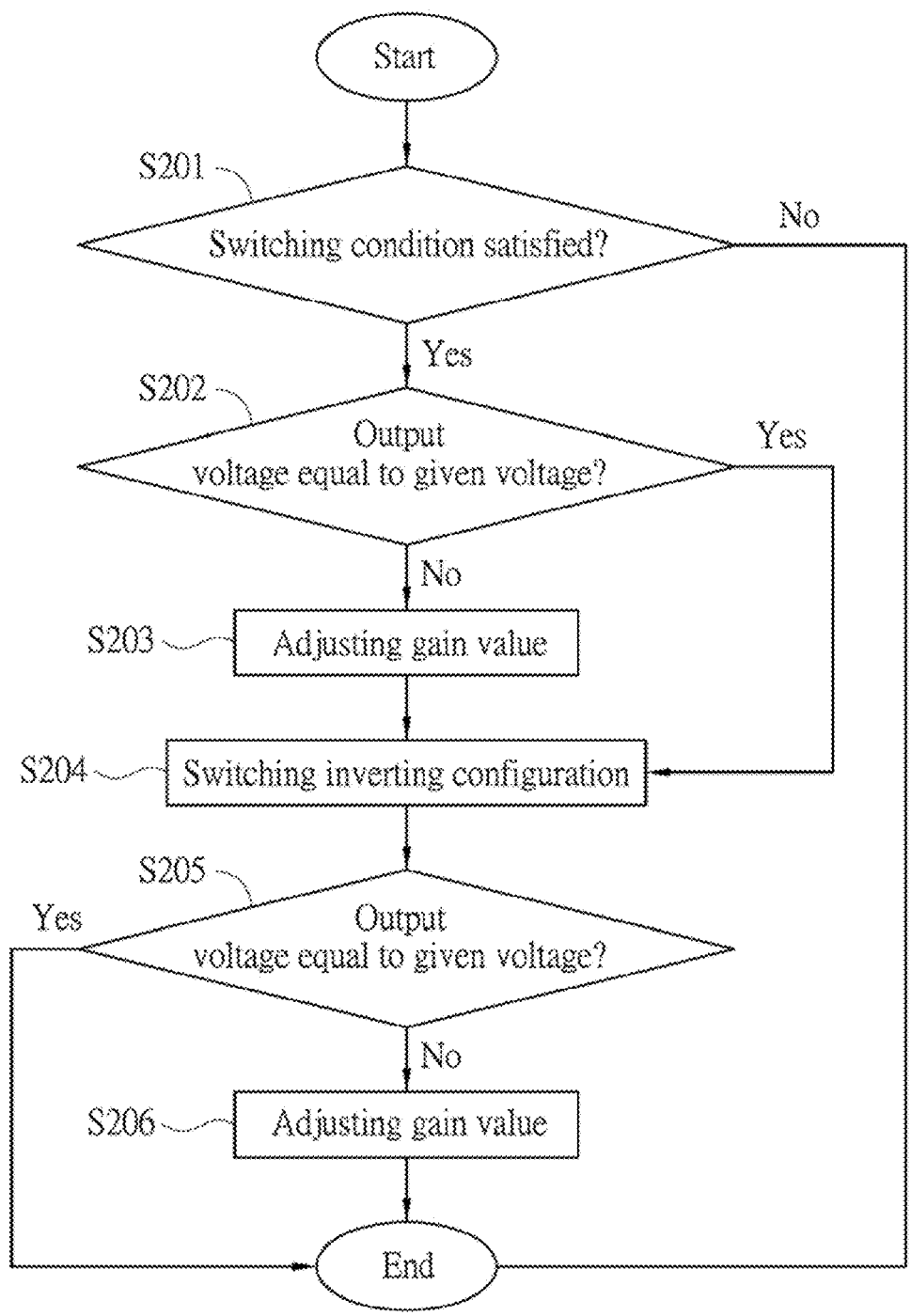
FIG. 2 is a flowchart of switching the operation between the two inversion modes according to one embodiment of the present disclosure.

Operations of the converter circuit 100*e* switching between the two inversion modes are described below with reference to FIG. 1E and FIG. 2. FIG. 2 is a flowchart of switching the operation between the two inversion modes according to one embodiment of the present disclosure. For illustrative purposes, in the following descriptions, the value of the output voltage Vo which is generated before the converter circuit switches from one inversion mode to the other and when the gain is not adjusted yet, is indicated as an output voltage value Vo1. First, the controller 140*b* determines whether a condition of switching the inversion mode is satisfied (Step S201). For example, whether the controller 140*b* receives a system command of changing the output voltage Vo or the output power Po is smaller than a given reference power is determined. Then, the controller 140*b* determines whether the output voltage value Vo1 (the voltage value corresponding to the output power Po) approaches or is equal to a given voltage value Voref1 that is obtained before switching the inversion mode (Step S202) (the given voltage value Voref1 is named for illustrative purposes and not labeled in the figure, and in the following descriptions the given voltage value Voref1 is defined as a given voltage value obtained before switching the inversion mode). When the output voltage value Vo1 approaches or is equal to the given voltage value Voref1, the controller 140*b* performs the control operation such that the converter circuit 100*e* switches from the first inversion mode (the full-bridge converter topology) to the second inversion mode (the half-bridge converter topology) (Step S204). On the other hand, when the output voltage value Vo1 fails to approach or be equal to the given voltage value Voref1, the controller 140*b* performs the control operation to adjust the gain, such that the value of the output voltage Vo is adjusted from the output voltage value Vo1 to approach or be equal to the given voltage value Voref1 (Step S203).

Figure 3A:
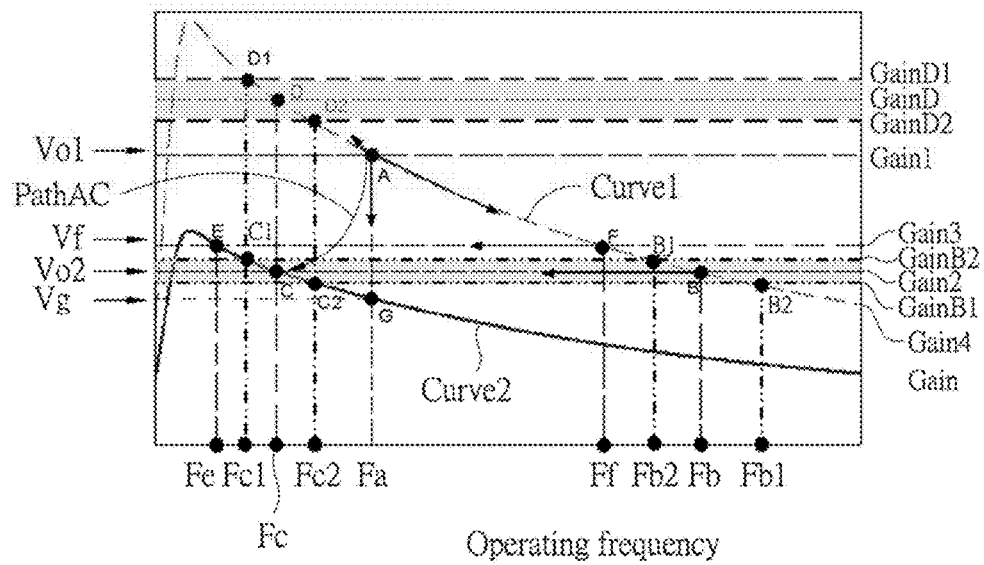
FIGS. 3A-3C are diagrams illustrating variation curves of the gain relative to the operating frequency of the switch, according to various embodiments of the present disclosure.
Figure 3B:
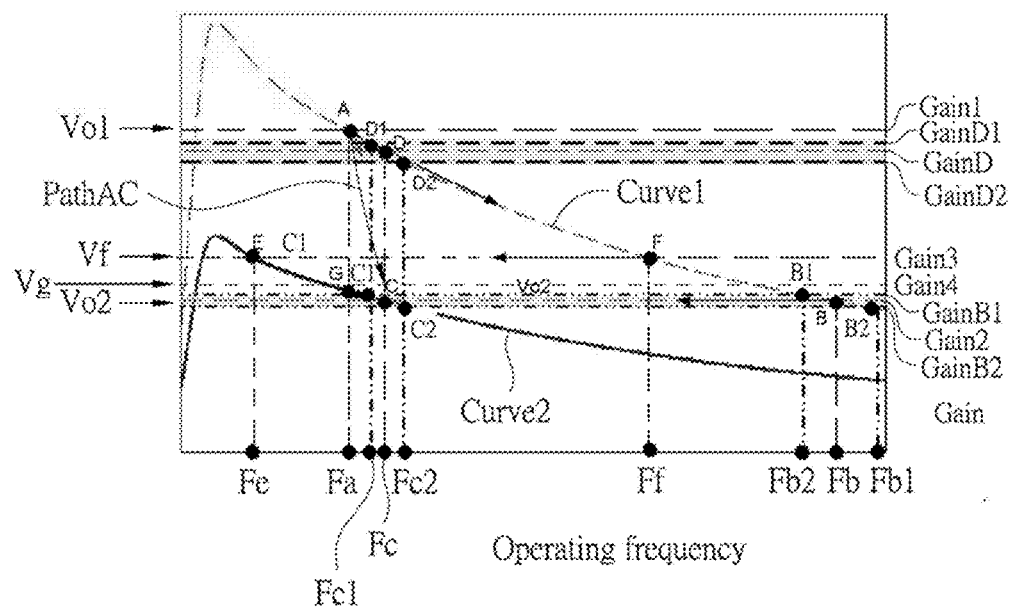
Figure 3C:
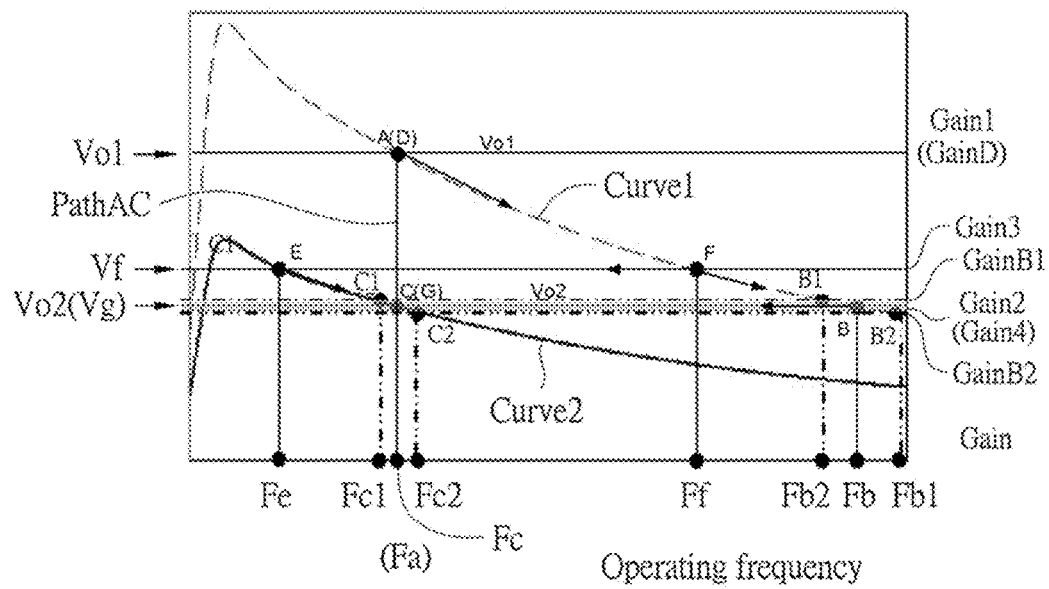

After the inversion mode is switched, the controller 140*b* determines whether the value of the output voltage Vo (i.e., the voltage value corresponding to the output power Po) is equal to the given voltage value obtained after switching the inversion mode (e.g., a given objective voltage value Vo2 as shown in FIGS. 3A-3C) (Step S205). When the value of the output voltage Vo is equal to the given voltage value, the converter circuit 100*e* accomplishes the operation of switching from one inversion mode to the other. On the other hand, when the value of the output voltage Vo is not equal to the given voltage value, the controller 140*b* performs the control operation to adjust the gain, such that the value of the output voltage Vo is equal to the given voltage value (Step S206).

Specific operations of switching inversion modes in various embodiments are described below with reference to FIG. 1E. For illustration in FIGS. 3A-3C, FIGS. 3A-3C are diagrams illustrating variation curves of the gain relative to the operating frequency of the switch, according to various embodiments of the present disclosure. Before switching the inversion mode, the controller 140*b* sets the given voltage value Voref1 as a reference level for comparison. After switching the inversion mode, the controller 140*b* sets a given target voltage value Vo2 as a reference level for comparison. FIG. 3A is a diagram illustrated in a condition of the given target voltage value Vo2 larger than 0.5 times the output voltage value Vo1. FIG. 3B is a diagram illustrated in a condition of the given target voltage value Vo2 smaller than 0.5 times the output voltage value Vo1. FIG. 3C is a diagram illustrated in a condition of the given target voltage value Vo2 equal to 0.5 times the output voltage value Vo1.

In FIGS. 3A-3C, the given target voltage value Vo2 corresponds to the gain value Gain2, and the output voltage value Vo1 corresponds to the gain value Gain1. The variation of the gain in the first inversion mode (the full-bridge converter topology) relative to the operating frequency is illustrated as Curve1. The variation of the gain in the second inversion mode (the half-bridge converter topology) relative to the operating frequency is illustrated as Curve2. In the first inversion mode (the full-bridge converter topology), the operating point A corresponds to the gain value Gain1 which corresponds to the output voltage value Vo1 obtained from the operation with the operating frequency Fa. In the second inversion mode (the half-bridge converter topology), under the condition of the output voltage value equal to the given target voltage value Vo2, the operating point C corresponds to the gain value Gain2 which corresponds to the output voltage value obtained from the operation with the operating frequency Fc. Operations of the converter circuit 100*e* switching from operating at the operating point A to operating at the operating point C are described below.

References are made to FIG. 3A and FIG. 1E. In one embodiment, the converter circuit 100*e* is adjusted from operating at the operating point A to operating at the operating point B, and then switches from operating at the operating point B to operating at the operating point C. In the first inversion mode (the full-bridge converter topology), under the condition of the output voltage value equal to the given target voltage value Vo2, the operating point B corresponds to the gain value Gain2 which corresponds to the output voltage value obtained from the operation with the operating frequency Fb; in other words, the operating points B and C correspond to the same output voltage value (i.e., the given target voltage value Vo2) and the same gain value Gain2. The difference is that, the operating point B is an operating point at which the converter circuit 100*e* operates in the first inversion mode, and the operating point C is an operating point at which the converter circuit 100*e* operates in the second inversion mode. In the present embodiment, the given voltage value Voref1 is set to approach the given target voltage value Vo2. Thus, after the condition of switching the inversion mode of the converter circuit 100*e* is satisfied, the controller 140*b* determines that the output voltage value Vo1 corresponding to the operating point A is not equal to the given voltage value Voref1 (i.e., the given target voltage value Vo2). The controller 140*b* performs the control operation for the converter circuit 100*e* to adjust the gain, such that the value of the output voltage Vo is adjusted, along the curve Curve1, from the output voltage value Vo1 (the operating point A) to be equal to the given voltage value Voref1 (near the operating point B).

In the present embodiment, the operating point of the controller 140*b*, in the condition of the value of the output voltage Vo being equal to the given voltage value Voref1, is located within a range between the operating points B1 and B2. The operating points B1 and B2 are operating points relative to a center point represented by the gain value Gain2, respectively, in the first inversion mode. The operating points B1 and B2 shown in FIG. 3A correspond to the gain value GainB1=[Gain2×(1+0.1)] and the gain value GainB2=[Gain2×(1−0.1)], respectively. The gain value corresponding to the adjusted output voltage Vo in the first inversion mode ranges between the gain value GainB1 and the gain value GainB2. Notably, the operating points B1 and B2 can be set corresponding to the gain value GainB1=[Gain2×(1+0.3)] and the gain value GainB2=[Gain2×(1−0.3)], respectively, but it is not limiting of the present disclosure.

Afterwards, the controller 140*b* performs the control operation, such that the converter circuit 100*e* switches from the first inversion mode (the full-bridge converter topology) to the second inversion mode (the half-bridge converter topology. More specifically, the controller 140*b* controls the switch Q41*d* of the switch unit 124*d* to maintain switched off, and controls the switch Q42*d* of the switch unit 124*d* to maintain switched on, and controls the switches Q21*d* and Q22*d* of the switch unit 122*d* to cooperate with each other with the half-bridge converter topology. In the operation of switching the inversion mode, under the condition of maintaining the gain value to be the same before and after switching the inversion mode, the controller 140*b* switches the operating frequency of the switch unit 122*d*. For example, the operating frequency approaching the operating frequency Fb is switched to the operating frequency approaching the operating frequency Fc (corresponding to the operating point near the operating point C). After switching the inversion mode, the controller 140*b* determines that the value of the output voltage Vo is not equal to the given target voltage value Vo2. Then, the controller 140*b* performs the control operation for the converter circuit 100*e* to dynamically adjust the gain along the curve Curve2, such that the value of the output voltage Vo is equal to the given target voltage value Vo2 (corresponding to the operating point C). Accordingly, for the converter circuit 100*e*, the operation of the output voltage Vo switching from having the output voltage value Vo1 to having the given target voltage value Vo2 is completed.

Notably, before switching the inversion mode, when the operating point is adjusted to the operating point B, the controller 140*b* switches the operating frequency of the switch unit 122*d* from the operating frequency Fb to the operating frequency Fc in the operation of switching the inversion mode.

By the aforementioned operation, the operation of the converter circuit 100*e* switching from operating at the operating point A through the operating point B to the operating point C has a better dynamic performance for the output voltage, and ripples of the output voltage are smaller.

References are made to FIG. 3A and FIG. 1E. In one embodiment, the converter circuit 100*e* is adjusted from operating at the operating point A to operating at the operating point D, and then switches from operating at the operating point D to operating at the operating point C. In the first inversion mode (the full-bridge converter topology), the operating point D corresponds to the gain value GainD=(2×Gain2) obtained from the operation with the operating frequency Fc; in other words, the operating points D and C correspond to the same operating frequency Fc. The difference is that, the operating point D is an operating point at which the converter circuit 100*e* operates in the first inversion mode, and the operating point C is an operating point at which the converter circuit 100*e* operates in the second inversion mode. In the present embodiment, the given voltage value Voref1 is set to approach the output voltage value corresponding to the gain value GainD. Thus, after the condition of switching the inversion mode of the converter circuit 100*e* is satisfied, the controller 140*b* determines that the output voltage value Vo1 (corresponding to the gain value Gain1) corresponding to the operating point A is not equal to the given voltage value Voref1. The controller 140*b* performs the control operation for the converter circuit 100*e* to adjust the gain, such that the value of the output voltage Vo is adjusted, along the curve Curve1, from the output voltage value Vo1 to the given voltage value Voref1 (i.e., the operating point A is adjusted to that near the operating point D).

In the present embodiment, the operating point of the controller 140*b*, in the condition of the value of the output voltage Vo being equal to the given voltage value Voref1, is located within a range between the operating points D1 and D2. The operating points D1 and D2 are operating points relative to a center point represented by the gain value GainD, respectively, in the first inversion mode. The operating points D1 and D2 shown in FIG. 3A correspond to the gain value GainD1=[2×Gain2×(1+0.1)] and the gain value GainD2=[2×Gain2×(1−0.1)], respectively. The gain value corresponding to the adjusted output voltage Vo in the first inversion mode ranges between the gain value GainD1 and the gain value GainD2. Notably, the operating points D1 and D2 can be set corresponding to the gain value GainD1=[2×Gain2×(1+0.3)] and the gain value GainD2=[2×Gain2×(1−0.3)], respectively, but it is not limiting of the present disclosure.

Afterwards, the controller 140*b* performs the control operation, such that the converter circuit 100*e* switches from the first inversion mode (the full-bridge converter topology) to the second inversion mode (the half-bridge converter topology). The operation of switching the inversion mode is described above, and thus it is not further detailed herein. In the operation of switching the inversion mode, the controller 140*b* maintains the operating frequency of the switch unit 122*d*, such that the operating frequency of the switch unit 122*d* is kept at an operating frequency (corresponding to the operating point near the operating point C) near the operating frequency Fc, before and after switching the inversion mode. After switching the inversion mode, the controller 140*b* determines that the value of the output voltage Vo is not equal to the given target voltage value Vo2. Then, the controller 140*b* performs the control operation for the converter circuit 100*e* to dynamically adjust the gain along the curve Curve2, such that the value of the output voltage Vo is equal to the given target voltage value Vo2 (corresponding to the operating point C). Accordingly, for the converter circuit 100*e*, the operation of the output voltage Vo switching from having the output voltage value Vo1 to having the given target voltage value Vo2 is completed.

References are made to FIG. 3A and FIG. 1E. In one embodiment, the converter circuit 100*e* is directly adjusted from operating at the operating point A to operating at the operating point C. In the present embodiment, the given voltage value Voref1 is set to approach the output voltage value corresponding to the gain value Gain2 (i.e., the value of the output voltage Vo is equal to the given target voltage value Vo2). Thus, after the condition of switching the inversion mode of the converter circuit 100*e* is satisfied, the controller 140*b* determines that the output voltage value Vo1 (corresponding to the gain value Gain1) corresponding to the operating point A is not equal to the given voltage value Voref1. The controller 140*b* performs the control operation for the converter circuit 100*e* to adjust the gain. In the operation of adjusting the gain, the controller 140*b* stops driving the switches in the inverter 120e which is electrically connected to the primary-side winding T1p, such that the value of the output voltage Vo is decreased by the discharging of the capacitor Cf, along PathAC, to the given voltage value Voref1 (i.e., the operating point A is adjusted to that near the operating point D).

In the present embodiment, the operating point of the controller 140b, in the condition of the value of the output voltage Vo being equal to the given voltage value Voref1, is located within a range between the operating points C1 and C2. The operating points C1 and C2 are operating points relative to a center point represented by the gain value Gain2, respectively, in the second inversion mode. The operating points C1 and C2 shown in FIG. 3A correspond to the gain value GainB1 and the gain value GainB2, respectively. After the capacitor Cf is discharged, the gain value corresponding to the output voltage Vo ranges between the gain value GainB1 and the gain value GainB2.

Afterwards, the controller 140b performs the control operation, such that the converter circuit 100e switches from the first inversion mode (the full-bridge converter topology) to the second inversion mode (the half-bridge converter topology. The operation of switching the inversion mode is described above, and thus it is not further detailed herein. After switching the inversion mode, the controller 140b determines that the value of the output voltage Vo is not equal to the given target voltage value Vo2. Then, the controller 140b performs the control operation, such that the converter circuit 100e dynamically adjusts the gain along the curve Curve2, such that the value of the output voltage Vo is equal to the given target voltage value Vo2 (corresponding to the operating point C). Accordingly, for the converter circuit 100e, the operation of the output voltage Vo switching from having the output voltage value Vo1 to having the given target voltage value Vo2 is completed.

By the aforementioned operation, the operation of the converter circuit 100e switching from operating at the operating point A through the discharging operation to the operating point C has a better dynamic performance for the output voltage.

References are made to FIG. 3A and FIG. 1E. In one embodiment, the converter circuit 100e is adjusted from operating at the operating point A to operating at the operating point F, and then switches to operating at the operating point E and then is adjusted to operating at the operating point C. In the first inversion mode (the full-bridge converter topology), the operating point F corresponds to the gain value Gain3 obtained from the operation with the operating frequency Ff. In the second inversion mode (the half-bridge converter topology), the operating point E corresponds to the gain value Gain3 obtained from the operation with the operating frequency Fe. In other words, the operating points E and F correspond to the same gain value Gain3. In the present embodiment, the given voltage value Voref1 is set to approach the output voltage value Vf corresponding to the operating point F. Thus, after the condition of switching the inversion mode of the converter circuit 100e is satisfied, the controller 140b determines that the output voltage value Vo1 (corresponding to the gain value Gain1) corresponding to the operating point A is not equal to the given voltage value Voref1 (the output voltage value Vf corresponding to the operating point F). The controller 140b performs the control operation for the converter circuit 100e to adjust the gain, such that the value of the output voltage Vo is adjusted, along the curve Curve1, from the output voltage value Vo1 to the given voltage value Voref1 (i.e., the operating point A is adjusted to that near the operating point F).

Afterwards, the controller 140b performs the control operation, such that the converter circuit 100e switches from the first inversion mode (the full-bridge converter topology) to the second inversion mode (the half-bridge converter topology. The operation of switching the inversion mode is described above, and thus it is not further detailed herein. In the operation of switching the inversion mode, under the condition of maintaining the gain value to be the same before and after switching the inversion mode, the controller 140b switches the operating frequency of the switch unit 122d. For example, the operating frequency Ff (corresponding to the operating point F) is switched to the operating frequency Fe (corresponding to the operating point E). After switching the inversion mode, the controller 140b determines that the value of the output voltage Vo is not equal to the given target voltage value Vo2. Then, the controller 140b performs the control operation, such that the converter circuit 100e dynamically adjusts the gain along the curve Curve2, such that the value of the output voltage Vo is equal to the given target voltage value Vo2 (corresponding to the operating point C). Accordingly, for the converter circuit 100e, the operation of the output voltage Vo switching from having the output voltage value Vo1 to having the given target voltage value Vo2 is completed.

The aforementioned four embodiments illustrate that in the converter circuit 100e, the gain is first adjusted along the curve Curve1 and then the inversion mode is switched, but they are not limiting of the present disclosure. Operations that the inversion mode of the converter circuit 100e is first switched and then the gain is adjusted are described by the following embodiments.

References are made to FIG. 3A and FIG. 1E. In one embodiment, the converter circuit 100e is adjusted from operating at the operating point A to operating at the operating point G, and then is adjusted to operating at the operating point C. In the second inversion mode (the half-bridge converter topology), the operating point G corresponds to the gain value Gain4 obtained from the operation with the operating frequency Fa; in other words, the operating points A and G correspond to the same operating frequency Fa. The difference is that, the operating point A is an operating point at which the converter circuit 100e operates in the first inversion mode, and the operating point G is an operating point at which the converter circuit 100e operates in the second inversion mode. In the present embodiment, the given voltage value Voref1 is set to be equal to the output voltage value Vo1 corresponding to the operating point A. Thus, after the condition of switching the inversion mode of the converter circuit 100e is satisfied, the controller 140b determines that the output voltage value Vo1 corresponding to the operating point A is equal to the given voltage value Voref1.

Then, the controller 140b performs the control operation for the converter circuit 100e to switch from the first inversion mode (the full-bridge converter topology) to the second inversion mode (the half-bridge converter topology). The operation of switching the inversion mode is described above, and thus it is not further detailed herein. In the operation of switching the inversion mode, the controller 140b maintains the operating frequency of the switch unit 122d, such that the operating frequency of the switch unit 122d is kept at the operating frequency Fa (corresponding to the operating point near the operating point G) before and after switching the inversion mode. After switching the inversion mode, the controller 140b determines that the value of the output voltage Vo is not equal to the given target voltage value Vo2. Then, the controller 140b performs the control operation for the converter circuit 100e to dynamically adjust the gain along the curve Curve2, such that the value of the output voltage V0 is equal to the given target voltage value Vo2 (corresponding to the operating point C). Accordingly, for the converter circuit 100e, the operation of the output voltage Vo switching from having the output voltage value Vo1 to having the given target voltage value Vo2 is completed.

The operations in the embodiments illustrated in FIG. 3B and FIG. 3C are similar to various operations in the embodiments illustrated in FIG. 3A, and thus they are not further detailed herein.

As shown in FIG. 1E, when the converter circuit 100e is operated in the second inversion mode (the half-bridge converter topology) before the inversion mode is switched, the value of the output voltage Vo is, for example, indicated as the output voltage value Vo4 before the converter circuit 100e switches the inversion mode when the gain is not adjusted, and the converter circuit 100e converts the output voltage Vo, through switching the inversion mode (e.g., switched to the first inversion mode), from having the output voltage value Vo4 to the given target voltage value Vo3.

Figure 4A:
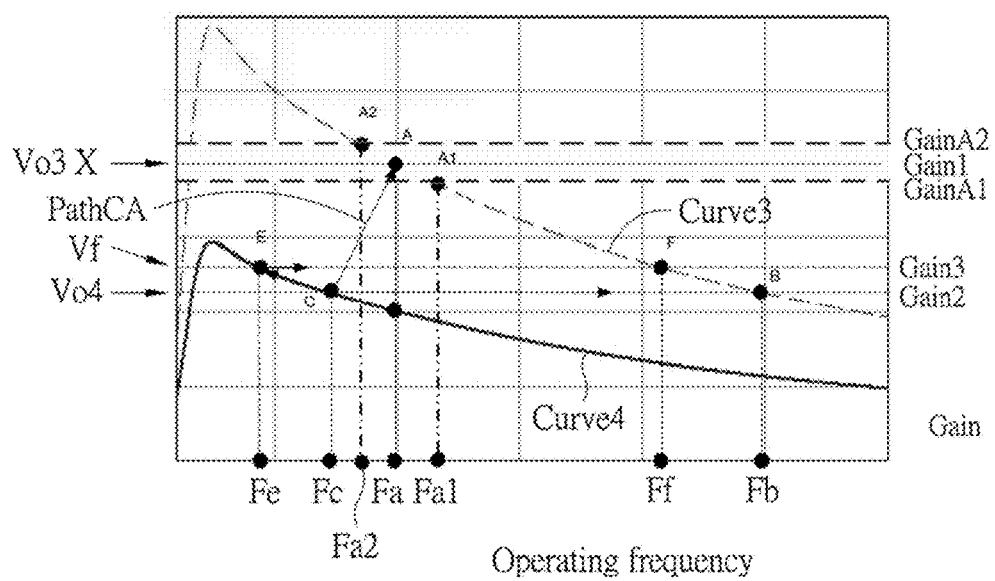
FIGS. 4A-4C are diagrams illustrating variation curves of the gain relative to the operating frequency of the switch, according to various embodiments of the present disclosure.
Figure 4B:
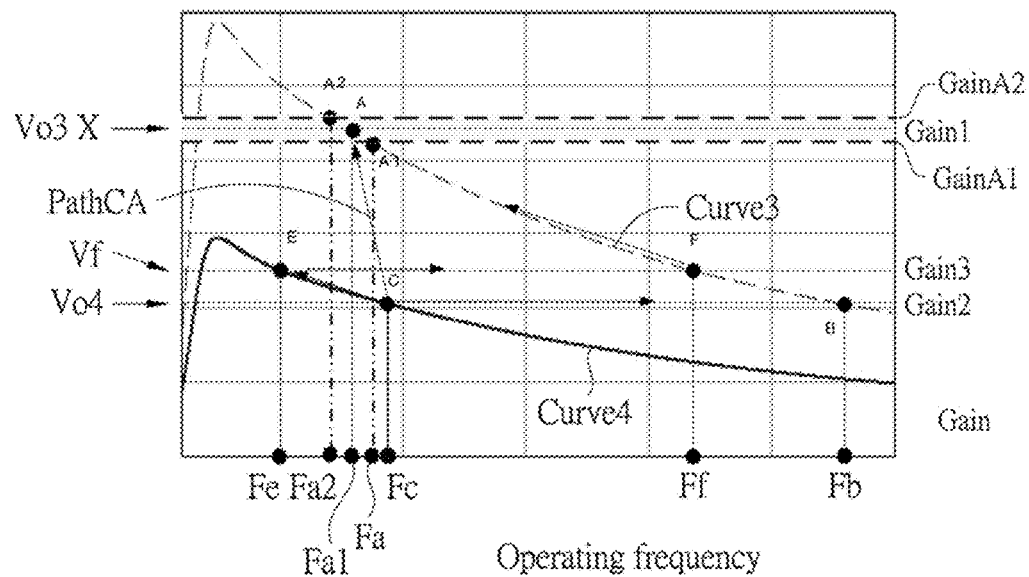
Figure 4C:
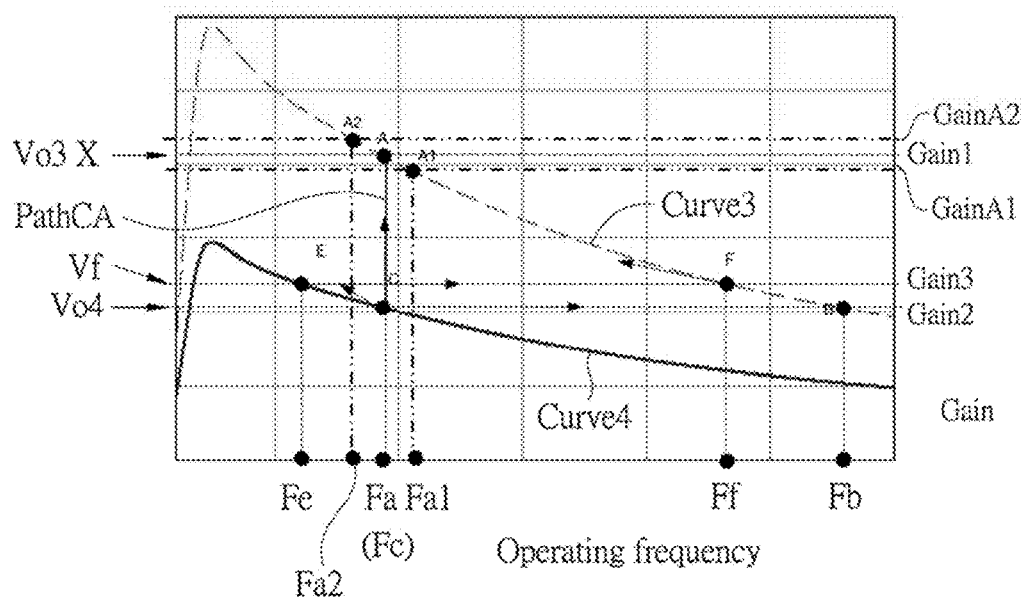

Specific operations of switching inversion modes in various embodiments are described below together with reference to FIG. 1E. For illustration in FIGS. 4A-4C, FIGS. 4A-4C are diagrams illustrating variation curves of the gain relative to the operating frequency of the switch, according to various embodiments of the present disclosure. Before switching the inversion mode, the controller 140b sets the given voltage value Voref1 as a reference level for comparison. After switching the inversion mode, the controller 140b sets the given target voltage value Vo3 as a reference level for comparison. FIG. 4A is a diagram illustrated in a condition of the output voltage value Vo4 larger than 0.5 times the given target voltage value Vo3. FIG. 4B is a diagram illustrated in a condition of the output voltage value Vo4 smaller than 0.5 times the given target voltage value Vo3. FIG. 4C is a diagram illustrated in a condition of the output voltage value Vo4 equal to 0.5 times the given target voltage value Vo3.

In FIGS. 4A-4C, the given target voltage value Vo3 corresponds to the gain value Gain1, and the output voltage value Vo4 corresponds to the gain value Gain2. The variation of the gain in the first inversion mode (the full-bridge converter topology) relative to the operating frequency is illustrated as Curve3. The variation of the gain in the second inversion mode (the half-bridge converter topology) relative to the operating frequency is illustrated as Curve4. In the first inversion mode (the full-bridge converter topology), under the condition of the output voltage value equal to the given target voltage value Vo3, the operating point A corresponds to the gain value Gain1 which corresponds to the output voltage value obtained from the operation with the operating frequency Fa. In the second inversion mode (the half-bridge converter topology), the operating point C corresponds to the gain value Gain2 which corresponds to the output voltage value Vo4 obtained from the operation with the operating frequency Fc. Operations of the converter circuit 100e switching from operating at the operating point C to operating at the operating point A are described below.

References are made to FIG. 4A and FIG. 1E. In one embodiment, the converter circuit 100e is switched from operating at the operating point C to operating at the operating point B, and then is adjusted from operating at the operating point B to operating at the operating point A. In the first inversion mode (the full-bridge converter topology), under the condition of the value of the output voltage Vo equal to the output voltage value Vo4, the operating point B corresponds to the gain value Gain2 which corresponds to the output voltage value obtained from the operation with the operating frequency Fb; in other words, the operating points B and C correspond to the same output voltage value (i.e., the output voltage value Vo4) and the same gain value Gain2. The difference is that, the operating point B is an operating point at which the converter circuit 100e operates in the first inversion mode, and the operating point C is an operating point at which the converter circuit 100e operates in the second inversion mode. In the present embodiment, the given voltage value Voref1 is set to be equal to the output voltage value Vo4. Thus, after the condition of switching the inversion mode of the converter circuit 100e is satisfied, the controller 140b determines that the output voltage value Vo4 corresponding to the operating point C is equal to the given voltage value Voref1 (i.e., the output voltage value Vo4).

Afterwards, the controller 140b performs the control operation, such that the converter circuit 100e switches from the first inversion mode (the full-bridge converter topology) to the second inversion mode (the half-bridge converter topology. More specifically, the controller 140b controls the switches Q21d and Q22d of the switch unit 122d and the switches Q41d and Q42d of the switch unit 124d to cooperate with each other with the half-bridge converter topology (e.g., in the second inversion mode, the switch Q41d is maintained switched off and the switch Q42d is maintained switched on). In the operation of switching the inversion mode, under the condition of maintaining the gain value to be the same before and after switching the inversion mode, the controller 140b switches the operating frequency of the switch unit 122d. For example, the operating frequency (corresponding to the operating point C) approaching the operating frequency Fc is switched to the operating frequency (corresponding to the operating point B) approaching the operating frequency Fb. After switching the inversion mode, the controller 140b performs the control operation for the converter circuit 100e to dynamically adjust the gain along the curve Curve1, such that the value of the output voltage Vo is equal to the given target voltage value Vo3 (corresponding to the operating point A). Accordingly, for the converter circuit 100e, the operation of the output voltage Vo switching from having the output voltage value Vo4 to having the given target voltage value Vo3 is completed.

References are made to FIG. 4A and FIG. 1E. In one embodiment, the converter circuit 100e is adjusted from operating at the operating point C to operating at the operating point A directly. In the present embodiment, the given voltage value Voref1 is set to be equal to the output voltage value corresponding to the gain value Gain2, i.e., the value of the output voltage Vo is equal to the output voltage value Vo4. Thus, after the condition of switching the inversion mode of the converter circuit 100e is satisfied, the controller 140b determines that the output voltage value Vo4 corresponding to the operating point C is equal to the given voltage value Voref1.

Afterwards, the controller 140b performs the control operation, such that the converter circuit 100e switches from the second inversion mode (the half-bridge converter topology) to the first inversion mode (the full-bridge converter topology). The operation of switching the inversion mode is described above, and thus it is not further detailed herein. In the operation of switching the inversion mode, the controller

140b synchronously adjusts the operating frequency of the switch units 122d and 124d, such that the operating frequency of the switch units 122d and 124d is adjusted from the operating frequency Fc (corresponding to the operating point C) to the operating frequency Fa (corresponding to the operating point A), and moreover, the value of the output voltage Vo is equal to the given target voltage value Vo3 after the inversion mode is switched. Accordingly, for the converter circuit 100e, the operation of the output voltage Vo switching from having the output voltage value Vo4 to having the given target voltage value Vo3 is completed.

References are made to FIG. 4A and FIG. 1E. In one embodiment, the converter circuit 100e is adjusted from operating at the operating point C to operating at the operating point E, and then switches to operating at the operating point F and then is adjusted to operating at the operating point A. In the first inversion mode (the full-bridge converter topology), the operating point F corresponds to the gain value Gain3 obtained from the operation with the operating frequency Ff. In the second inversion mode (the half-bridge converter topology), the operating point E corresponds to the gain value Gain3 obtained from the operation with the operating frequency Fe. In other words, the operating points E and F correspond to the same gain value Gain3. In the present embodiment, the given voltage value Voref1 is set to be the output voltage value Vf corresponding to the operating point E. Thus, after the condition of switching the inversion mode of the converter circuit 100e is satisfied, the controller 140b determines that the output voltage value Vo4 (corresponding to the gain value Gain2) corresponding to the operating point C is not equal to the given voltage value Voref1 (the output voltage value Vf corresponding to the operating point E). The controller 140b performs the control operation for the converter circuit 100e to adjust the gain, such that the value of the output voltage Vo is adjusted, along the curve Curve2, from the output voltage value Vo4 to the given voltage value Voref1 (i.e., the operating point C is adjusted to the operating point E).

Afterwards, the controller 140b performs the control operation, such that the converter circuit 100e switches from the second inversion mode (the half-bridge converter topology) to the first inversion mode (the full-bridge converter topology). The operation of switching the inversion mode is described above, and thus it is not further detailed herein. In the operation of switching the inversion mode, under the condition of maintaining the gain value to be the same before and after switching the inversion mode, the controller 140b switches the operating frequency of the switch units 122d and 124d. For example, the operating frequency Fe (corresponding to the operating point E) is switched to the operating frequency Ff (corresponding to the operating point F). After switching the inversion mode, the controller 140b determines that the value of the output voltage Vo is not equal to the given target voltage value Vo3. Then, the controller 140b performs the control operation, such that the converter circuit 100e dynamically adjusts the gain along the curve Curve3, such that the value of the output voltage Vo is equal to the given target voltage value Vo3 (corresponding to the operating point A). Accordingly, for the converter circuit 100e, the operation of the output voltage Vo switching from having the output voltage value Vo4 to having the given target voltage value Vo3 is completed.

The operations in the embodiments illustrated in FIG. 4B and FIG. 4C are similar to various operations in the embodiments illustrated in FIG. 4A, and thus they are not further detailed herein.

Figure 5A:
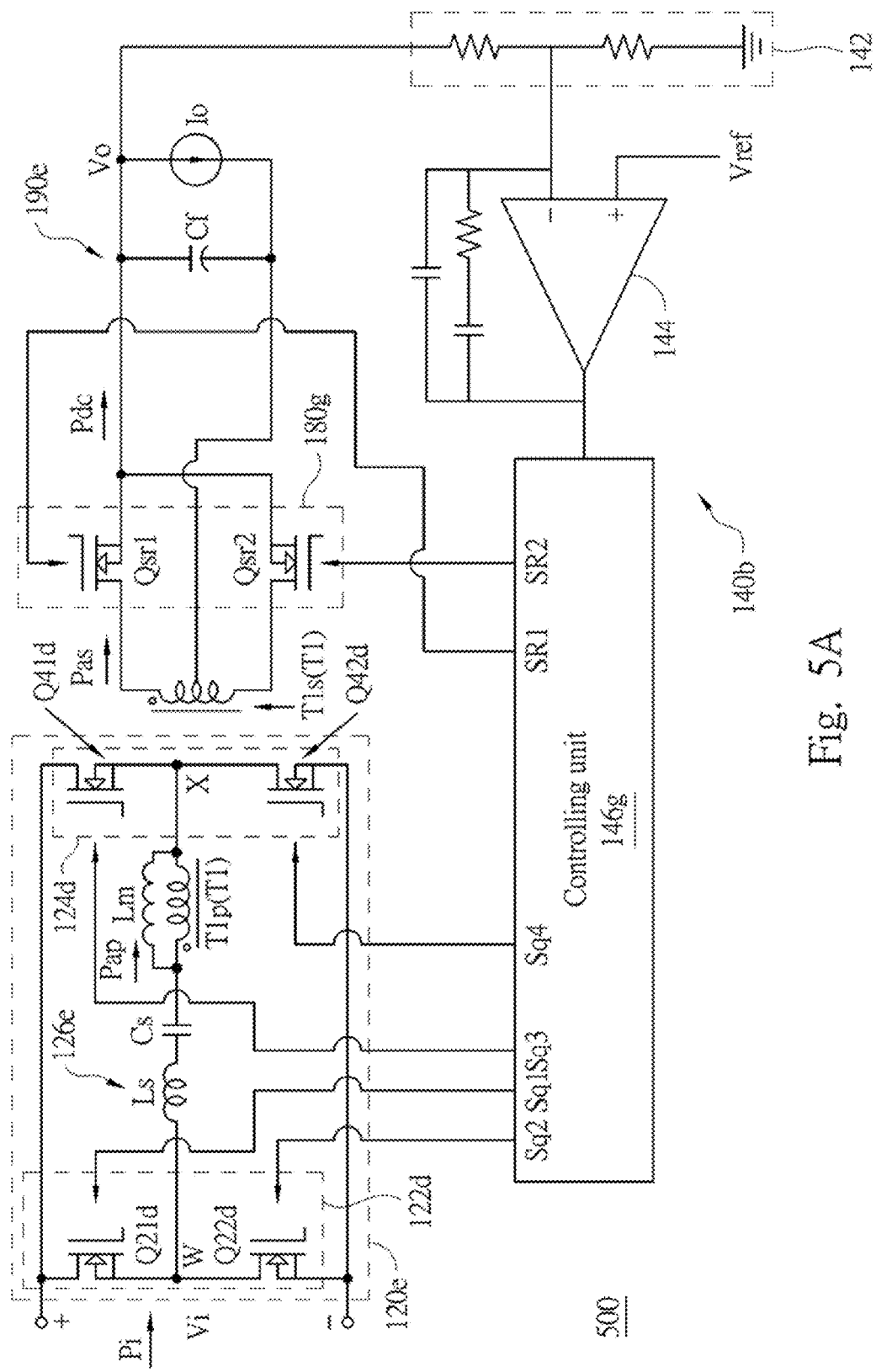
FIG. 5A is a schematic diagram of a converter circuit according to another embodiment of the present disclosure.
Figure 5B:
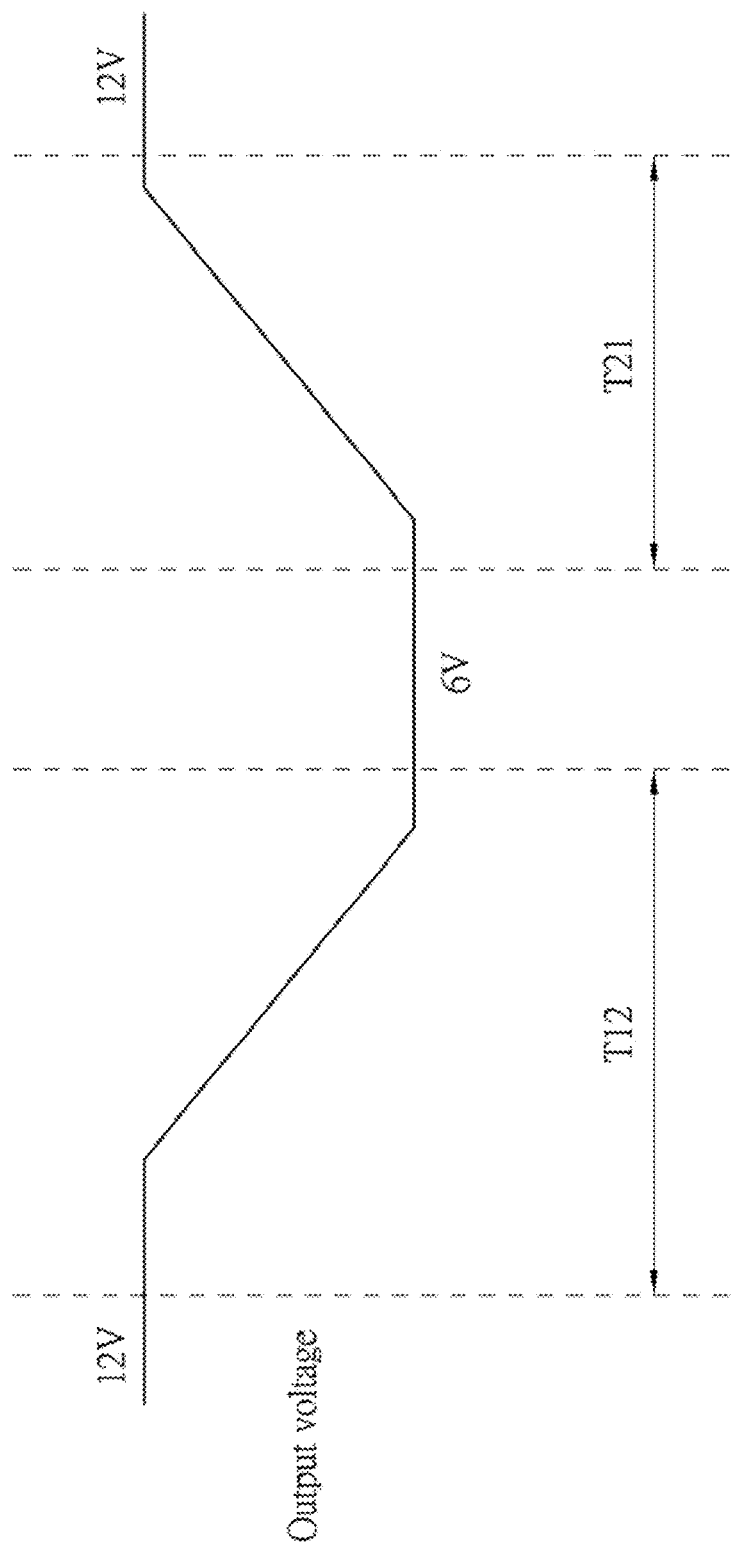
FIG. 5B is a waveform diagram of the output voltage of the converter circuit as shown in FIG. 5A.
Figure 5C:
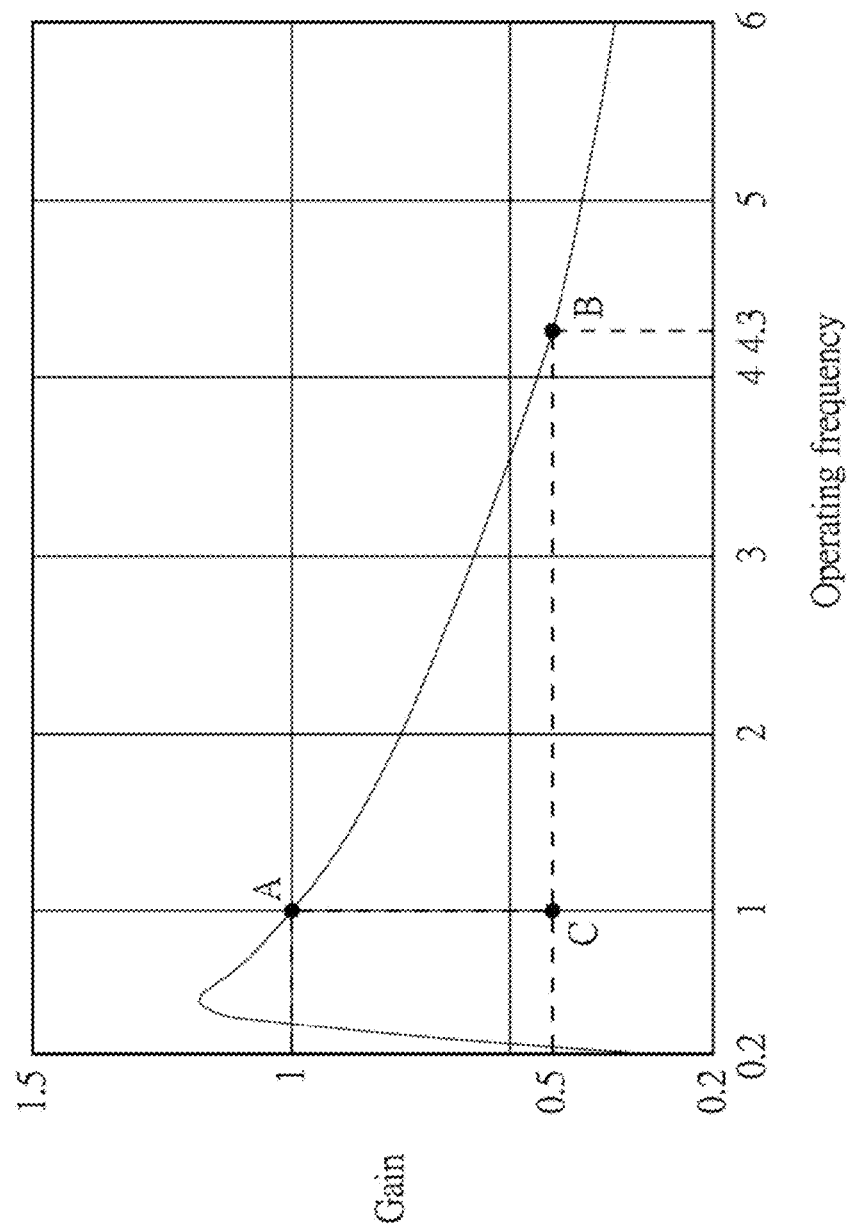
FIG. 5C is a diagram illustrating a variation curve of the gain of the converter circuit as shown in FIG. 5A relative to the operating frequency.
Figure 5D:
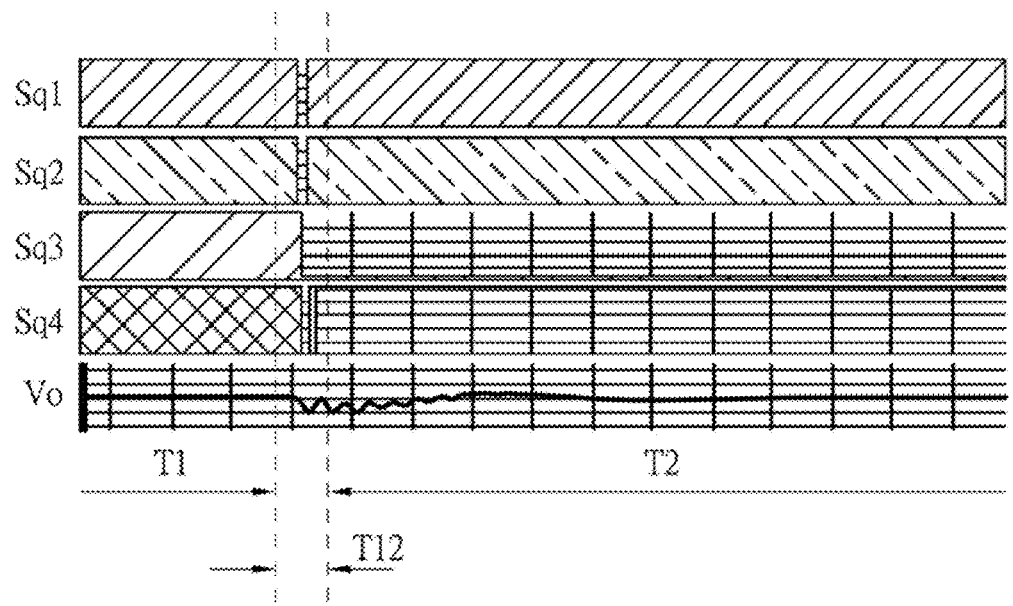
FIGS. 5D-5E are diagrams illustrating timing diagrams of driving signals for the converter circuit as shown in FIG. 5A.
Figure 5E:
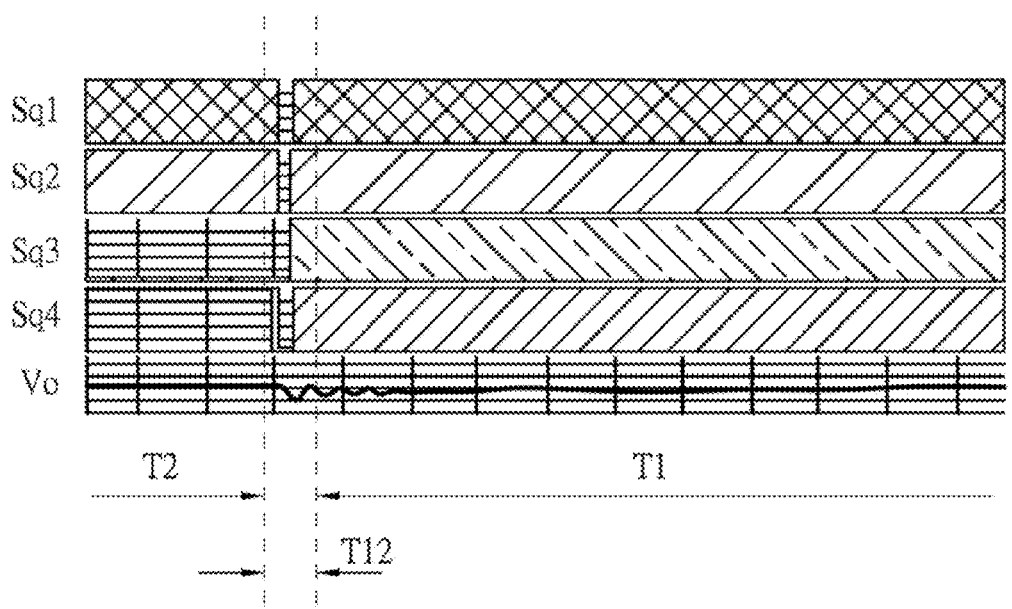

FIGS. 5A-5E illustrate specific embodiments of another converter circuit according to some embodiments of the present disclosure. FIG. 5A is a schematic diagram of a converter circuit according to another embodiment of the present disclosure. FIG. 5B is a waveform diagram of the output voltage of the converter circuit as shown in FIG. 5A. FIG. 5C is a diagram illustrating a variation curve of the gain of the converter circuit as shown in FIG. 5A relative to the operating frequency. FIGS. 5D-5E are diagrams illustrating timing diagrams of driving signals for the converter circuit as shown in FIG. 5A.

As shown in FIG. 5A, compared to the converter circuit 100e as shown FIG. 1E, the filter 180g in the converter circuit 500 is a synchronous rectifier, and the filter 180g includes switches Qsr1 and Qsr2. The configuration and operation of the converter circuit 500 are similar to those of the converter circuit 100e illustrated in FIG. 1E, and thus they are not further detailed herein.

When the converter circuit 500 operates normally, the output voltage Vo in the first inversion mode (the full-bridge converter topology) is 12 volts. For example, the converter circuit 500 has a resonant frequency of 200 KHz, a turns ratio of the transformer T1 is 32:1, the converter circuit 500 operates near an operating point which corresponds to the resonant frequency, and a normalized DC current of the converter circuit 500 is $M(\Omega, h, Q)$, in which the normalized circuit parameters h=7.7 and Q=0.4, and $\Omega$ is a normalized operating frequency. As a result, the output current is 50 A, and the dynamic variation range of the output voltage is satisfied with Vo±0.5 V.

In specific operation, the output voltage Vo needs to be changed to 6 V, so as to satisfy the requirement of increasing efficiency of the entire system. As shown in FIG. 5B, during the time period T12, the converter circuit 500 switches the output voltage Vo of 12 V to the output voltage Vo of 6 V by switching the converter topology.

For illustration in FIG. 5C, the variation of the gain relative to the operating frequency in the first inversion mode (the full-bridge converter topology) is illustrated as the curve Curve51, and the operating point at which the converter circuit 500 operates with the gain of 0.5 in the second inversion mode (the half-bridge converter topology) is illustrated as the operating point C.

As shown in FIG. 5C, the converter circuit 500 operates in the first inversion mode at the beginning of the time period T12. The operating point at which the converter circuit 500 operates at the beginning of the time period T12 is the operating point A, in which the operating point A corresponds to the gain value of 1, the operating frequency of 1 and the output voltage Vo of 12 V. If the value of the output voltage Vo is required to be changed to 6 V, for example, at the last of the time period T12 as shown in FIG. 5B, the gain of the converter circuit 500 needs to be adjusted to a half of the gain corresponding to the operating point A, i.e., gain value of 0.5. If the converter circuit 500 is maintained in the first inversion mode (the full-bridge converter topology) and operates to adjust the gain to be 0.5 along the curve Curve51, the operating frequency needs to be adjusted from 1 to 4.3, i.e., 4.3 times the resonant frequency, which corresponds to the operating point B as shown in FIG. 5C. The operation of the operating point A being adjusted to the operating point B in the first inversion mode has no significant effect for increasing the efficiency of the entire system.

However, the converter circuit 500 first deactivates, at the operating point A, the driving (e.g., pulse width modulation driving) of the circuit connected to the primary-side winding T1p in a number of pulse periods, and then the converter circuit 500 switches from the first inversion mode (the full-bridge converter topology) to the second inversion mode (the half-bridge converter topology) to switch from operating at the operating point A to operating at the operating point C. In order to satisfy a standard of a typical dynamic variation range of the output voltage Vo, in the converter circuit 500 with the second inversion mode, the switch unit 122d or 124d is required to operate with the operating frequency of 1 corresponding to the operating point C, or to operate with the operating frequency near the operating frequency of 1.

When the converter circuit 500 operates in the second inversion mode (the half-bridge converter topology) and receives a system command for changing the value of the output voltage Vo from 6 V to 12 V (i.e., within the time period T21 as shown in FIG. 5B), the converter circuit 500 first deactivates, at the operating point C, the driving of the circuit connected to the primary-side winding T1p in a number of pulse periods, and then the converter circuit 500 switches to operate in the first inversion mode (the full-bridge converter topology), to switch from operating at the operating point C to operating at the operating point A, such that the value of the output voltage Vo from is stabilized at 12 V. In order to satisfy the standard of the typical dynamic variation range of the output voltage Vo, in the converter circuit 500 with the first inversion mode, the switch unit 122d or 124d is required to operate with the operating frequency of 1 corresponding to the operating point A, or to operate with the operating frequency near the operating frequency of 1.

The driving operation of the converter circuit 500 switching from the first inversion mode (the full-bridge converter topology) to the second inversion mode (the half-bridge converter topology) can be performed together with driving signals Sq1-Sq4 as shown in FIG. 5D. The driving operation of the converter circuit 500 switching from the second inversion mode to the first inversion mode can be performed together with driving signals Sq1-Sq4 as shown in FIG. 5E. In FIG. 5D, the converter circuit 500 is maintained operated in the first inversion mode (the full-bridge converter topology) in the time period T1, and switches from the first inversion mode to the second inversion mode (the half-bridge converter topology) in the time period T12. The operating frequency of the switches in the converter circuit 500 approaches to the resonant frequency when the converter circuit 500 just switches to the second inversion mode, and the dynamic variation range of the output voltage Vo meets the typical standard.

As can be known from the aforementioned embodiments, the converter system which adopts the converter circuit and the operation thereof, that are illustrated in the present disclosure, can be applied for demands of various loads. Under the condition that it is required to increase the output voltage, the converter circuit illustrated in the present disclosure can switch from the half-bridge converter topology to the full-bridge converter topology. On the other hand, under the condition that it is required to decrease the output voltage, the converter circuit illustrated in the present disclosure can switch from the full-bridge converter topology to the half-bridge converter topology. As a result, requirements of various output loads can be met, and the entire efficiency of the converter system can be significantly enhanced at the same time.

Figure 6A:
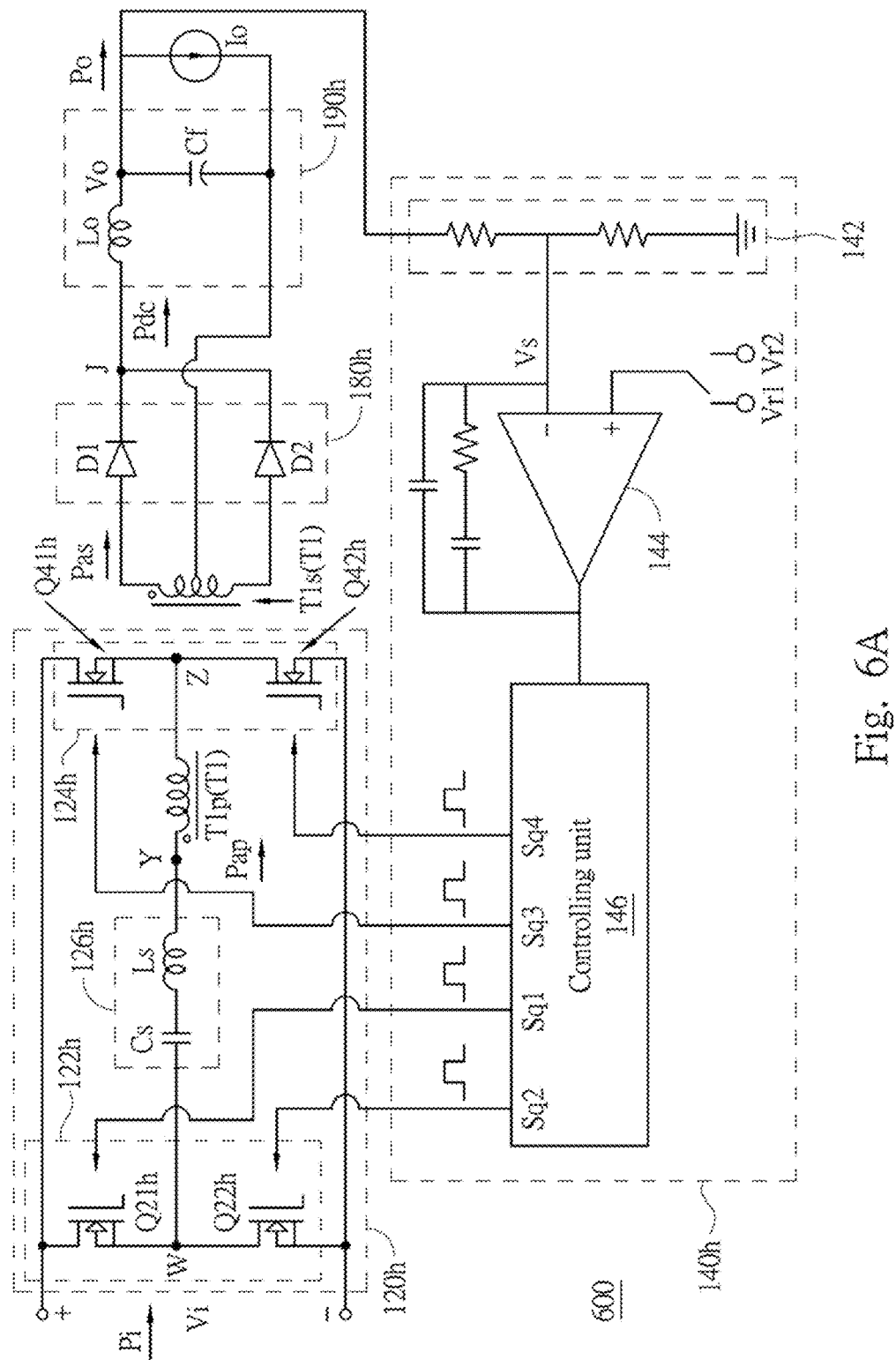
FIG. 6A is a diagram illustrating a converter circuit according to yet another embodiment of the present disclosure.

In addition, the converter circuit illustrated in the present disclosure is not limited to the aforementioned converter circuit (e.g., the resonant-type converter circuit), and the converter circuit illustrated in the present disclosure also can be a pulse width modulation (PWM) type converter circuit. For illustration in FIG. 6A, FIG. 6A is a diagram illustrating a converter circuit according to yet another embodiment of the present disclosure. The converter circuit 600 is a phase shift full-bridge converter circuit. Compared to the converter circuit 100e illustrated in FIG. 1E, the filter 190h in the converter circuit 600 includes a serially connected inductor Lo and a capacitor Cf connected in parallel with the load. Moreover, the magnetizing inductor connected with the inverter 120h is implemented by the magnetizing inductance of the transformer T1 itself. Furthermore, the inductor Ls in the resonant circuit 126h can be the leakage inductance of the transformer T1, in which the leakage inductance of the transformer T1 is integrated into the transformer T1.

Figure 6B:
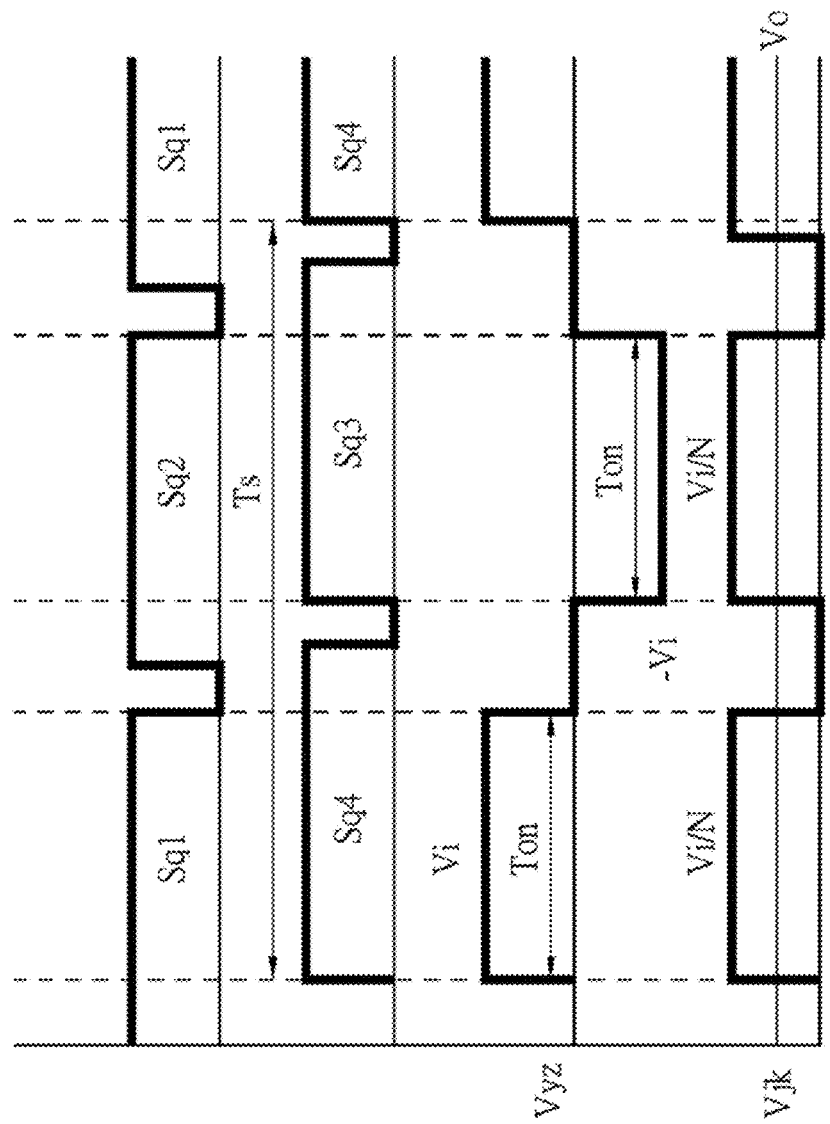
FIG. 6B is a diagram illustrating waveforms of driving signals for the converter circuit in FIG. 6A.

The converter circuit 600 can be operated in the first inversion mode (the full-bridge converter topology). For illustration in FIG. 6B, FIG. 6B is a diagram illustrating waveforms of driving signals for the converter circuit in FIG. 4) 6A. The driving signals Sq1 and Sq2 are separately configured for driving the switches Q21h and Q22h in the switch unit 122h, and the driving signals Sq3 and Sq4 are separately configured for driving the switches Q41h and Q42h in the switch unit 122h. The driving signals Sq1 and Sq2 are complementary with a phase of 180 degree, such that the switches Q21h and Q22h are complementarily switched on. The driving signals Sq3 and Sq4 are complementary with a phase of 180 degree, such that the switches Q41h and Q42h are complementarily switched on. The driving signals for the switch unit 122h and the switch unit 124h have a phase difference, and the phase difference also can be indicated as a switch-on angle. The controller 140h regulates the switch-on angle, such that in the converter circuit 600, the voltage Vyz across the node Y and the node Z is indicated by an AC signal with an amplitude of the input voltage Vi. The AC signal indicating the voltage Vyz is converted by the converter circuit 600 and rectified by the rectifier 180h, such that the voltage Vjk across the node J and the node K is indicated by a DC signal with an amplitude of Vi/N, in which N is a transformer ratio of the transformer T1. The DC signal indicating the voltage Vjk has a duty cycle Duty equal to Ton/(0.5×Ts), in which Ton is a switch-on interval of the switches, and Ts is a switching period, as shown in FIG. 6B. The controller 140h regulates the duty cycle Duty of the voltage Vjk to adjust the output voltage Vo. Therefore, the converter circuit 600 in the first inversion mode can generate the output voltage Vo equal to (Duty× Vi)/N.

Figure 6C:
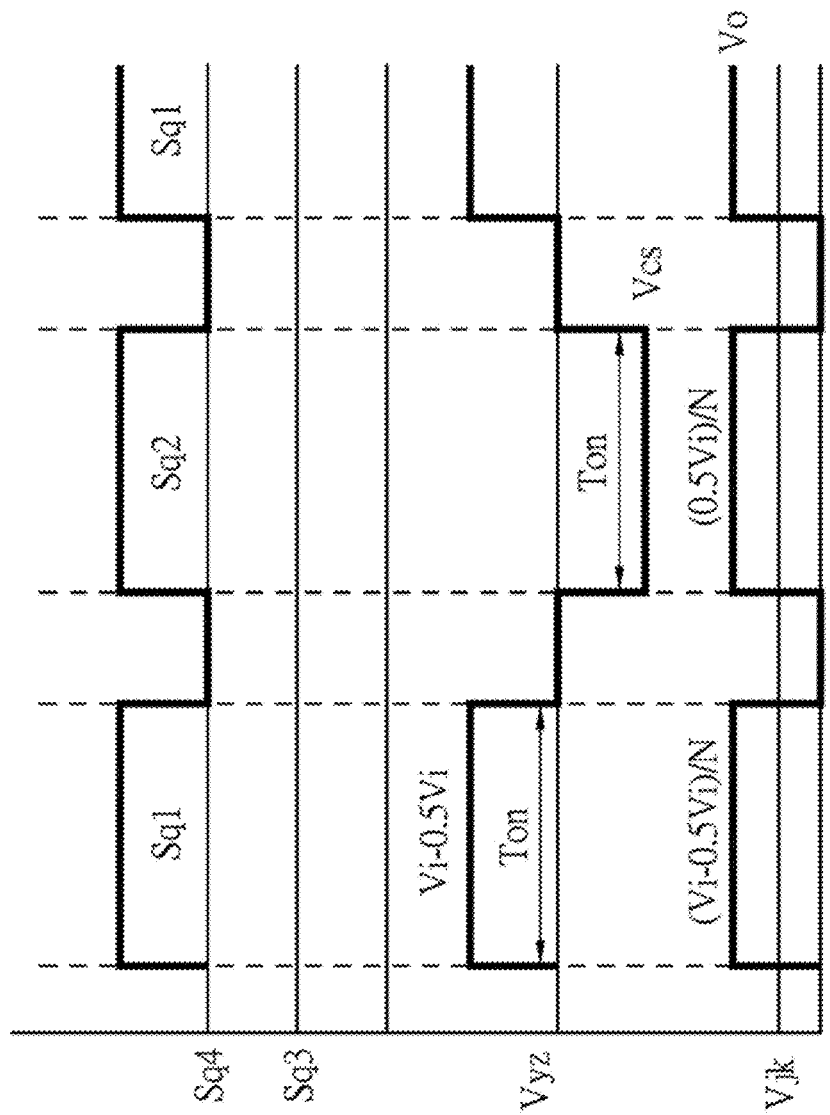
FIG. 6C is a diagram illustrating waveforms of driving signals for the converter circuit in FIG. 6A.

The converter circuit 600 can be operated in the second inversion mode (the half-bridge converter topology). For illustration in FIG. 6C, FIG. 6C is a diagram illustrating waveforms of driving signals for the converter circuit in FIG. 6A. Compared to FIG. 6B, in the second inversion mode, the driving signal Sq4 is at a high level, and the driving signal Sq3 is at a low level, such that the switch Q41h is maintained switched off in the second inversion mode, and the switch Q42h is maintained switched on in the second inversion mode, resulting in that the converter circuit 600 switches from the first inversion mode to the second inversion mode. The converter circuit 600 converts power through the alternated switch-on and switch-off of the switch Q21h cooperating with the switch Q22h in the switch unit 122h. The converter circuit 600 in the second inversion mode can be indicated as a symmetric half-bridge converter circuit.

In the present embodiment, the controller 140h regulates the pulse widths of the driving signals Sq1 and Sq2 to correspondingly adjust the duty cycles of the switches Q21h and Q22h, such that the duty cycle Duty of the voltage Vyz is correspondingly adjusted. As shown in FIG. 6C, in the converter circuit 600, the voltage Vyz across the node Y and the node Z is indicated by an AC signal with an amplitude of 0.5×Vi, and the AC signal indicating the voltage Vyz is converted by the converter circuit 600 and rectified by the rectifier 180h, such that the voltage Vjk across the node J and the node K is indicated by a DC signal with an amplitude of 0.5×Vi/N, in which N is the transformer ratio of the transformer T1. Therefore, the converter circuit 600 in the second inversion mode can generate the output voltage Vo equal to (Duty×Vi)/2N, in which the duty cycle Duty is equal to Ton/(0.5×Ts), Ton is a switch-on interval of the switches, and Ts is a switching period. Therefore, under the condition with the same duty cycle Duty, compared to the first inversion mode, the converter circuit 600 in the second inversion mode generates a half of the output voltage Vo.

The operation of switching the inversion mode of the converter circuit 600 can be performed as shown in FIG. 2, in which the step of adjusting the gain includes the following operations. The controller 140h regulates the duty cycle of the switches of at least one of the switch unit 122h and the switch unit 124h, to adjust the gain value associated with the output voltage Vo and the input voltage Vi, or to adjust the duty cycle. The rest of the operations are similar to those mentioned above, and thus they are not further detailed herein.

Figure 7A:
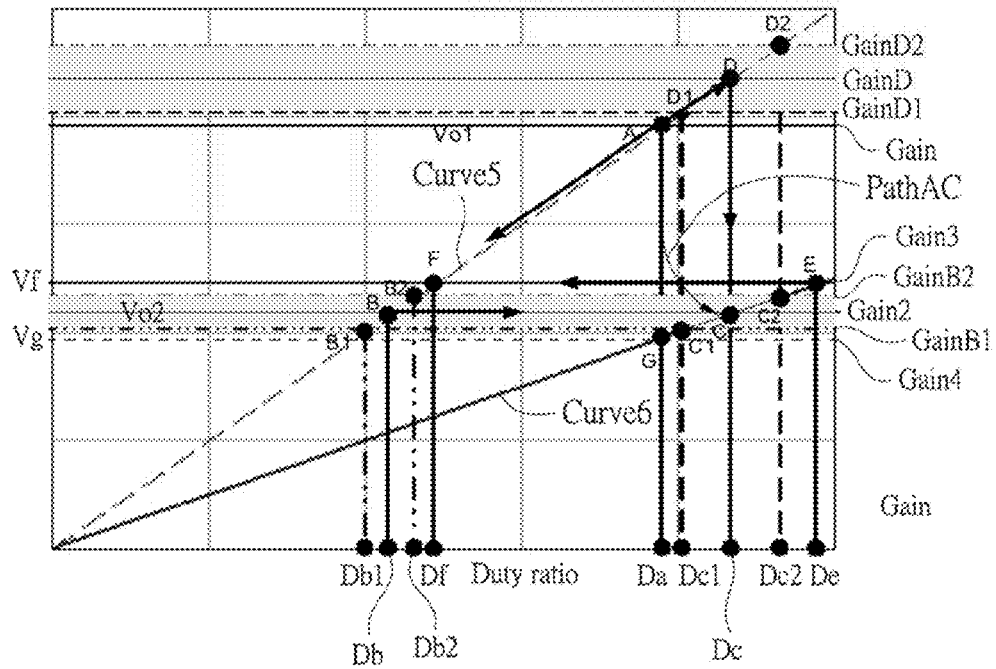
FIGS. 7A-7C are diagrams illustrating variation curves of the gain relative to the duty cycle of the switch, according to various embodiments of the present disclosure.
Figure 7B:
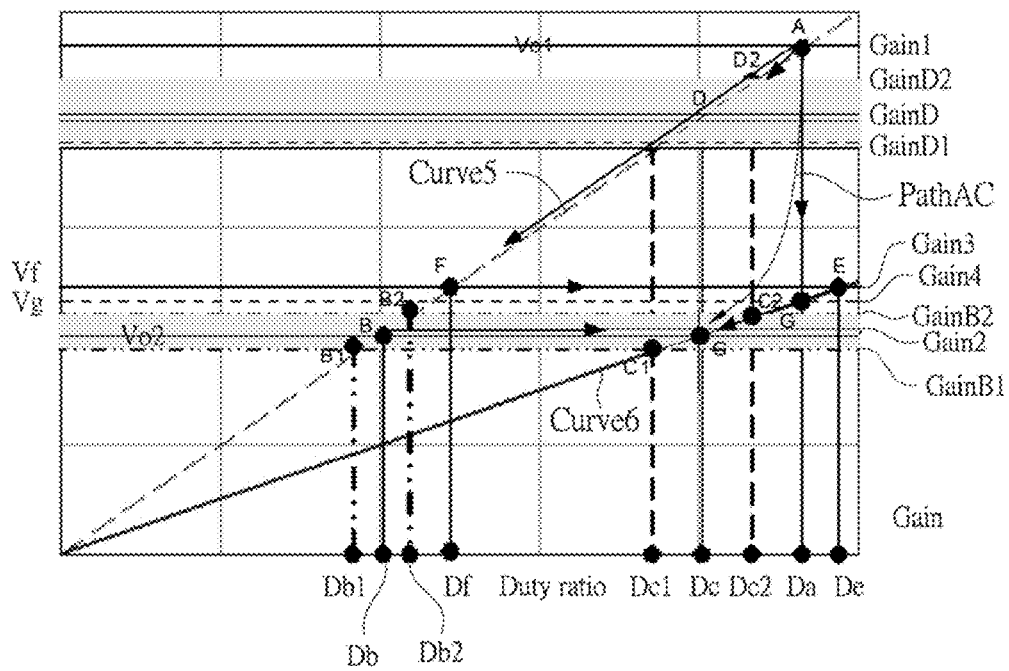
Figure 7C:
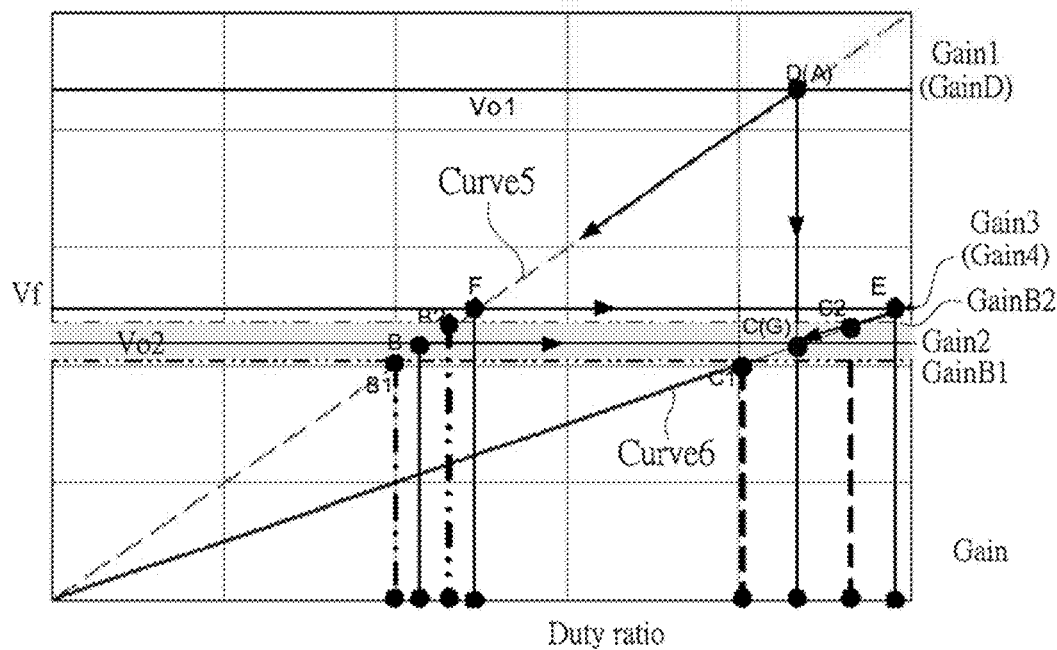

Specific operations of switching inversion modes in various embodiments are described below with reference to FIG. 6A. For illustration in FIGS. 7A-7C, FIGS. 7A-7C are diagrams illustrating variation curves of the gain relative to the duty cycle of the switch, according to various embodiments of the present disclosure. Before switching the inversion mode, i.e., in the first inversion mode (the full-bridge converter topology), the controller 140h sets the given voltage value Voref1 as a reference level for comparison. After switching the inversion mode, i.e., in the second inversion mode (the half-bridge converter topology), the controller 140b sets the given target voltage value Vo2 as a reference level for comparison. FIG. 7A is a diagram illustrated in a condition of the given target voltage value Vo2 larger than 0.5 times the output voltage value Vo1. FIG. 7B is a diagram illustrated in a condition of the given target voltage value Vo2 smaller than 0.5 times the output voltage value Vo1. FIG. 7C is a diagram illustrated in a condition of the given target voltage value Vo2 equal to 0.5 times the output voltage value Vo1. The output voltage value Vo1 is the value of the output voltage Vo of the converter circuit 600, in which the gain thereof is not adjusted yet, in the first inversion mode (the full-bridge converter topology).

In FIGS. 7A-7C, the given target voltage value Vo2 corresponds to the gain value Gain2, and the output voltage value Vo1 corresponds to the gain value Gain1. The variation of the gain in the first inversion mode (the full-bridge converter topology) relative to the duty cycle is illustrated as Curve5. The variation of the gain in the second inversion mode (the half-bridge converter topology) relative to the duty cycle is illustrated as Curve6. In the first inversion mode (the full-bridge converter topology), the operating point A corresponds to the gain value Gain1 which corresponds to the output voltage value Vo1 obtained from the operation with the duty cycle Da. In the second inversion mode (the half-bridge converter topology), under the condition of the output voltage value equal to the given target voltage value Vo2, the operating point C corresponds to the gain value Gain2 which corresponds to the output voltage value obtained from the operation with the duty cycle Dc. Operations of the converter circuit 600 switching from operating at the operating point A to operating at the operating point C are described below.

References are made to FIG. 7A and FIG. 6A. In one embodiment, the converter circuit 600 is adjusted from operating at the operating point A to operating at the operating point B, and then switches from operating at the operating point B to operating at the operating point C. In the first inversion mode (the full-bridge converter topology), under the condition of the output voltage value equal to the given target voltage value Vo2, the operating point B corresponds to the gain value Gain2 which corresponds to the output voltage value obtained from the operation with the duty cycle Db. In the present embodiment, the given voltage value Voref1 is set to approach the given target voltage value Vo2. Thus, after the condition of switching the inversion mode of the converter circuit 600 is satisfied, the controller 140h performs the control operation for the converter circuit 600 to adjust the gain, such that the value of the output voltage Vo is adjusted, along the curve Curve5, from the output voltage value Vo1 (the operating point A) to be equal to the given voltage value Voref1 (near the operating point B).

In the present embodiment, the operating point of the controller 140h, in the condition of the value of the output voltage Vo equal to the given voltage value Voref1, is located within a range between the operating points B1 and B2. The operating points B1 and B2 shown in FIG. 7A correspond to the gain value GainB1=[Gain2×(1−0.1)] and the gain value GainB2=[Gain2×(1+0.1)], respectively.

Afterwards, the controller 140h performs the control operation, such that the converter circuit 600 switches from the first inversion mode (the full-bridge converter topology) to the second inversion mode (the half-bridge converter topology. In the operation of switching the inversion mode, under the condition of maintaining the gain value to be the same before and after switching the inversion mode, the controller 140h switches the duty cycle. For example, the duty cycle approaching the duty cycle Db is switched to the duty cycle approaching the duty cycle Dc (corresponding to the operating point near the operating point C). After switching the inversion mode, the controller 140h performs the control operation for the converter circuit 600 to dynamically adjust the gain along the curve Curve6, such that the value of the output voltage Vo is equal to the given target voltage value Vo2 (corresponding to the operating point C). Accordingly, for the converter circuit 600, the operation of the output voltage Vo switching from having the output voltage value Vo1 to having the given target voltage value Vo2 is completed.

Notably, before switching the inversion mode, when the operating point is adjusted to the operating point B, the controller 140h switches the duty cycle from Db to Dc in the operation of switching the inversion mode, and the gain is kept the same during the operation.

By the aforementioned operation, the operation of the converter circuit 600 switching from operating at the operating point A through the operating point B to the operating point C has a better dynamic performance for the output voltage, and ripples of the output voltage are smaller.

References are made to FIG. 7A and FIG. 6A. In one embodiment, the converter circuit 600 is adjusted from operating at the operating point A to operating at the operating point D, and then switches from operating at the operating point D to operating at the operating point C. In the first inversion mode (the full-bridge converter topology), the operating point D corresponds to the gain value GainD=(2×Gain2) obtained from the operation with the duty cycle Dc. In the present embodiment, the given voltage value Voref1 is set to approach the output voltage value corresponding to the gain value GainD. Thus, the controller 140*h* performs the control operation for the converter circuit 600 to adjust the gain, such that the value of the output voltage Vo is adjusted, along the curve Curve5, from the output voltage value Vo1 to the given voltage value Voref1 (i.e., the operating point A is adjusted to that near the operating point D).

In the present embodiment, the operating point of the controller 140*b*, in the condition of the value of the output voltage Vo being equal to the given voltage value Voref1, is located within a range between the operating points D1 and D2, in which the operating points D1 and D2 shown in FIG. 7A correspond to the gain value GainD1=[2×Gain2×(1−0.1)] and the gain value GainD2=[2×Gain2×(1+0.1)], respectively.

Afterwards, the controller 140*h* performs the control operation, such that the converter circuit 600 switches from the first inversion mode (the full-bridge converter topology) to the second inversion mode (the half-bridge converter topology). In the operation of switching the inversion mode, under the condition of the controller 140*h* maintaining the duty cycle to be the same such that the duty cycle is maintained near the duty cycle Dc (corresponding to the operating point near the operating point C) before and after switching the inversion mode. After switching the inversion mode, the controller 140*h* performs the control operation for the converter circuit 600 to dynamically adjust the gain along the curve Curve6, such that the value of the output voltage Vo is equal to the given target voltage value Vo2 (corresponding to the operating point C). Accordingly, for the converter circuit 600, the operation of the output voltage Vo switching from having the output voltage value Vo1 to having the given target voltage value Vo2 is completed.

References are made to FIG. 7A and FIG. 6A. In one embodiment, the converter circuit 600 is directly adjusted from operating at the operating point A to operating at the operating point C. In the present embodiment, the given voltage value Voref1 is set to approach the output voltage value corresponding to the gain value Gain2 (i.e., the value of the output voltage Vo is equal to the given target voltage value Vo2). Thus, after the condition of switching the inversion mode of the converter circuit 600 is satisfied, the controller 140*h* performs the control operation for the converter circuit 600 to adjust the gain. In the operation of adjusting the gain, the controller 140*h* stops driving the switches Q21*h*, Q22*h*, Q41*h*, and Q42*h* in the inverter 120*h* which is electrically connected to the primary-side winding T1*p*, such that the value of the output voltage Vo is decreased by the discharging of the capacitor Cf, along PathAC, to the given voltage value Voref1 (i.e., the operating point A is adjusted to that near the operating point C).

In the present embodiment, the operating point of the controller 140*h*, in the condition of the value of the output voltage Vo being equal to the given voltage value Voref1, is located within a range between the operating points C1 and C2. The operating points C1 and C2 shown in FIG. 7A correspond to the gain value GainB1 and the gain value GainB2, respectively.

Afterwards, the controller 140*h* performs the control operation, such that the converter circuit 600 switches from the first inversion mode (the full-bridge converter topology) to the second inversion mode (the half-bridge converter topology. After switching the inversion mode, the controller 140*h* performs the control operation for the converter circuit 600 to dynamically adjust the gain along the curve Curve6, such that the value of the output voltage Vo is equal to the given target voltage value Vo2 (corresponding to the operating point C). Accordingly, for the converter circuit 600, the operation of the output voltage Vo switching from having the output voltage value Vo1 to having the given target voltage value Vo2 is completed.

References are made to FIG. 7A and FIG. 6A. In one embodiment, the converter circuit 600 is adjusted from operating at the operating point A to operating at the operating point F, and then switches to operating at the operating point E and then is adjusted to operating at the operating point C. In the first inversion mode (the full-bridge converter topology), the operating point F corresponds to the gain value Gain3 obtained from the operation with the duty cycle Df. In the second inversion mode (the half-bridge converter topology), the operating point E corresponds to the gain value Gain3 obtained from the operation with the duty cycle De. In the present embodiment, the given voltage value Voref1 is set to approach the output voltage value Vf corresponding to the operating point F. Thus, the controller 140*h* performs the control operation for the converter circuit 600 to adjust the gain, such that the value of the output voltage Vo is adjusted, along the curve Curve5, from the output voltage value Vo1 to the given voltage value Voref1 (i.e., the operating point A is adjusted to that near the operating point F).

Afterwards, the controller 140*h* performs the control operation, such that the converter circuit 600 switches from the first inversion mode (the full-bridge converter topology) to the second inversion mode (the half-bridge converter topology. In the operation of switching the inversion mode, under the condition of maintaining the gain value to be the same before and after switching the inversion mode, the controller 140*h* switches the duty cycle from Df (corresponding to the operating point F) to De (corresponding to the operating point E). After switching the inversion mode, the controller 140*h* performs the control operation, such that the converter circuit 600 dynamically adjusts the gain along the curve Curve6, such that the value of the output voltage Vo is equal to the given target voltage value Vo2 (corresponding to the operating point C). Accordingly, for the converter circuit 600, the operation of the output voltage Vo switching from having the output voltage value Vo1 to having the given target voltage value Vo2 is completed.

The aforementioned four embodiments illustrate that in the converter circuit 600, the gain is first adjusted along the curve Curve5 and then the inversion mode is switched, but they are not limiting of the present disclosure. Operations that the inversion mode of the converter circuit 600 is first switched and then the gain is adjusted are described by the following embodiments.

References are made to FIG. 7A and FIG. 6A. In one embodiment, the converter circuit 600 is adjusted from operating at the operating point A to operating at the operating point G, and then is adjusted to operating at the operating point C. In the second inversion mode (the half-bridge converter topology), the operating point G corresponds to the gain value Gain4 obtained from the operation with the duty cycle Da.

In the present embodiment, the given voltage value Voref1 is set to be equal to the output voltage value Vo1 corresponding to the operating point A. Thus, after the condition of switching the inversion mode of the converter circuit 600 is satisfied, the controller 140*h* performs the control operation for the converter circuit 600 to switch from the first inversion mode (the full-bridge converter topology) to the second inversion mode (the half-bridge converter topology). In the operation of switching the inversion mode, the controller 140*h* maintains the duty cycle, such that the duty cycle is kept at the duty cycle Da (corresponding to the operating point near the operating point G) before and after switching the inversion mode. After switching the inversion mode, the controller 140*h* performs the control operation for the converter circuit 600 to dynamically adjust the gain along the curve Curve6, such that the value of the output voltage Vo is equal to the given target voltage value Vo2 (corresponding to the operating point C). Accordingly, for the converter circuit 600, the operation of the output voltage Vo switching from having the output voltage value Vo1 to having the given target voltage value Vo2 is completed.

The operations in the embodiments illustrated in FIG. 7B and FIG. 7C are similar to various operations in the embodiments illustrated in FIG. 7A, and thus they are not further detailed herein.

As shown in FIG. 6A, when the converter circuit 600 is operated in the second inversion mode (the half-bridge converter topology) before the inversion mode is switched, the value of the output voltage Vo is, for example, indicated as the output voltage value Vo4 before the converter circuit 600 switches the inversion mode when the gain is not adjusted, and the converter circuit 600 converts the output voltage Vo, through switching the inversion mode (e.g., switched to the first inversion mode or the full-bridge converter topology), from having the output voltage value Vo4 to the given target voltage value Vo3.

Figure 8A:
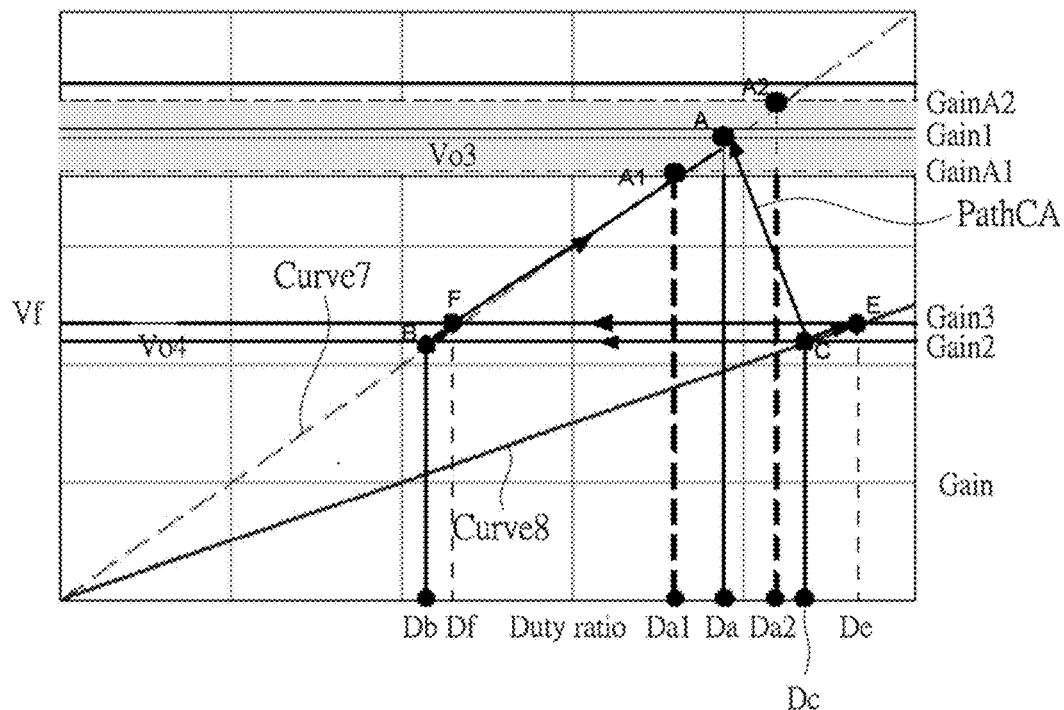
FIGS. 8A-8C are diagrams illustrating variation curves of the gain relative to the duty cycle, according to various embodiments of the present disclosure.
Figure 8B:
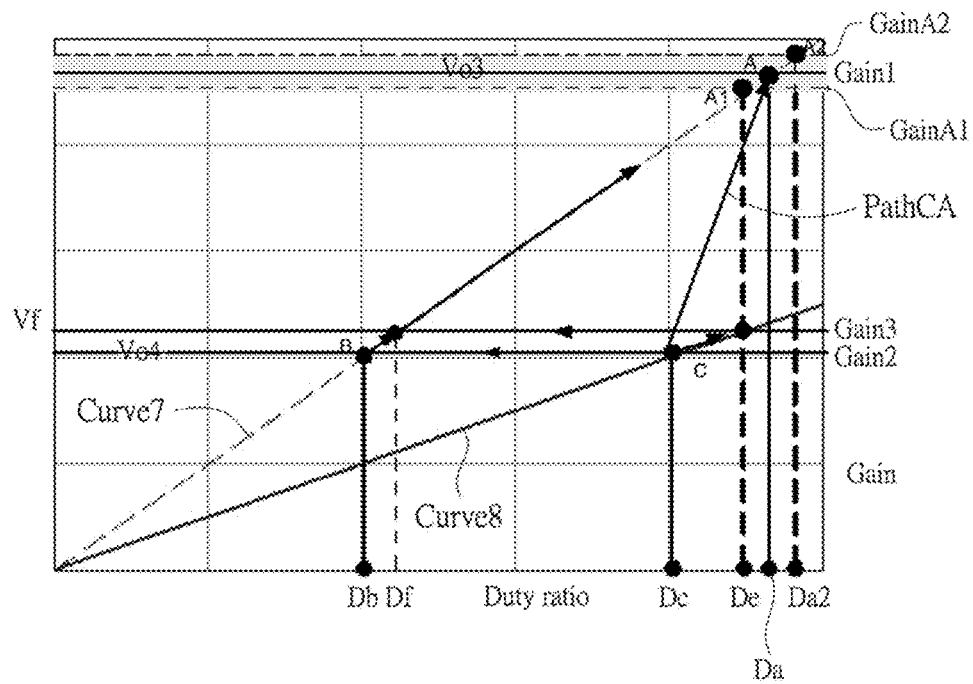
Figure 8C:
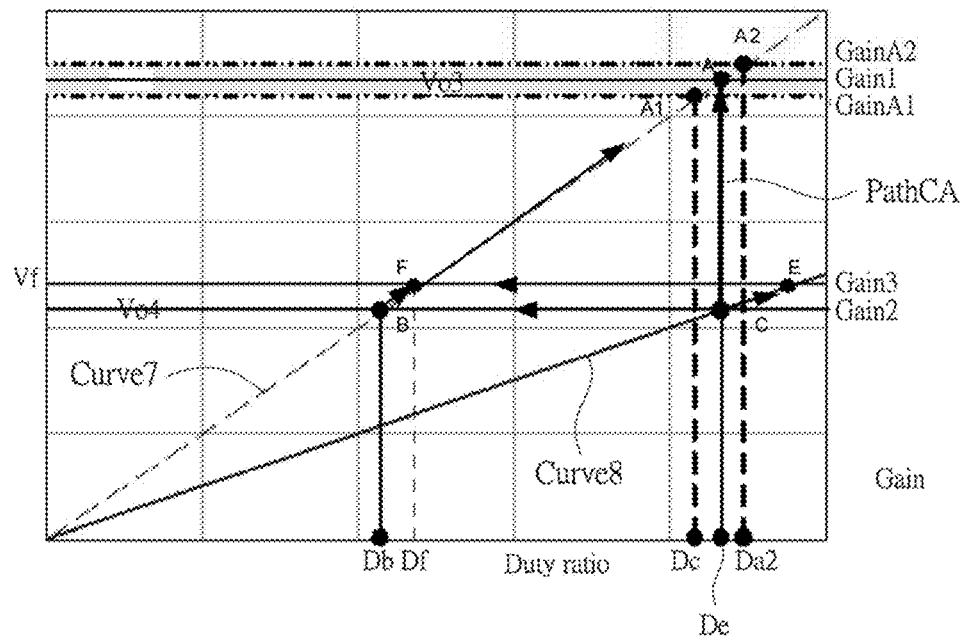

Specific operations of switching inversion modes in various embodiments are described below together with reference to FIG. 6A. For illustration in FIGS. 8A-8C, FIGS. 8A-8C are diagrams illustrating variation curves of the gain relative to the duty cycle, according to various embodiments of the present disclosure. Before switching the inversion mode, the controller 140*h* sets the given voltage value Voref1 as a reference level for comparison. After switching the inversion mode, the controller 140*h* sets the given target voltage value Vo3 as a reference level for comparison. FIG. 8A is a diagram illustrated in a condition of the output voltage value Vo4 larger than 0.5 times the given target voltage value Vo3. FIG. 8B is a diagram illustrated in a condition of the output voltage value Vo4 smaller than 0.5 times the given target voltage value Vo3. FIG. 8C is a diagram illustrated in a condition of the output voltage value Vo4 equal to 0.5 times the given target voltage value Vo3.

In FIGS. 8A-8C, the given target voltage value Vo3 (which is equal to the output voltage Vo) corresponds to the gain value Gain1, and the output voltage value Vo4 corresponds to the gain value Gain2. The variation of the gain in the first inversion mode (the full-bridge converter topology) relative to the duty cycle is illustrated as Curve7. The variation of the gain in the second inversion mode (the half-bridge converter topology) relative to the duty cycle is illustrated as Curve8. In the first inversion mode (the full-bridge converter topology), under the condition of the output voltage value equal to the given target voltage value Vo3, the operating point A corresponds to the gain value Gain1 which corresponds to the output voltage value obtained from the operation with the duty cycle Da. In the second inversion mode (the half-bridge converter topology), the operating point C corresponds to the gain value Gain2 which corresponds to the output voltage value Vo4 obtained from the operation with the duty cycle Dc. Operations of the converter circuit 600 switching from operating at the operating point C to operating at the operating point A are described below.

References are made to FIG. 8A and FIG. 6A. In one embodiment, the converter circuit 600 is switched from operating at the operating point C to operating at the operating point B, and then is adjusted from operating at the operating point B to operating at the operating point A. In the first inversion mode (the full-bridge converter topology), under the condition of the value of the output voltage Vo equal to the output voltage value Vo4, the operating point B corresponds to the gain value Gain2 which corresponds to the output voltage value obtained from the operation with the duty cycle Db. In the present embodiment, the given voltage value Voref1 is set to be equal to the output voltage value Vo4. Thus, after the condition of switching the inversion mode of the converter circuit 600 is satisfied, the controller 140*h* performs the control operation, such that the converter circuit 600 switches from the first inversion mode (the full-bridge converter topology) to the second inversion mode (the half-bridge converter topology.

More specifically, the controller 140*h* controls the switches Q21*h* and Q22*h* of the switch unit 122*h* and the switches Q41*h* and Q42*h* of the switch unit 124*h* to cooperate with each other with the full-bridge converter topology (e.g., in the second inversion mode, the switch Q41*h* is maintained switched off and the switch Q42*h* is maintained switched on). In the operation of switching the inversion mode, under the condition of maintaining the gain value to be the same before and after switching the inversion mode, the controller 140*h* switches the duty cycle from Dc to Db (corresponding to the operating point B). After switching the inversion mode, the controller 140*h* performs the control operation for the converter circuit 600 to dynamically adjust the gain along the curve Curve7, such that the value of the output voltage Vo is equal to the given target voltage value Vo3 (corresponding to the operating point A). Accordingly, for the converter circuit 600, the operation of the output voltage Vo switching from having the output voltage value Vo4 to having the given target voltage value Vo3 is completed.

References are made to FIG. 8A and FIG. 6A. In one embodiment, the converter circuit 600 is adjusted from operating at the operating point C to operating at the operating point A directly. In the present embodiment, the given voltage value Voref1 is set to be equal to the output voltage value corresponding to the gain value Gain2, i.e., the value of the output voltage Vo is equal to the output voltage value Vo4. Thus, after the condition of switching the inversion mode of the converter circuit 600 is satisfied, the controller 140*h* performs the control operation, such that the converter circuit 600 switches from the second inversion mode (the half-bridge converter topology) to the first inversion mode (the full-bridge converter topology). In the operation of switching the inversion mode, the controller 140*h* synchronously adjusts the duty cycle from Dc (corresponding to the operating point C) to Da (corresponding to the operating point A), such that the value of the output voltage Vo is equal to the given target voltage value Vo3 after the inversion mode is switched. Accordingly, for the converter circuit 600, the operation of the output voltage Vo switching from having the output voltage value Vo4 to having the given target voltage value Vo3 is completed.

References are made to FIG. 8A and FIG. 6A. In one embodiment, the converter circuit 600 is adjusted from operating at the operating point C to operating at the operating point E, and then switches to operating at the operating point F and then is adjusted to operating at the operating point A. In the first inversion mode (the full-bridge converter topology), the operating point F corresponds to the gain value Gain3 obtained from the operation with the duty cycle Df. In the second inversion mode (the half-bridge converter topology), the operating point E corresponds to the gain value Gain3 obtained from the operation with the duty cycle De. In the present embodiment, the given voltage value Voref1 is set to be the output voltage value Vf corresponding to the operating point E. Thus, after the condition of switching the inversion mode of the converter circuit 600 is satisfied, the controller 140h performs the control operation for the converter circuit 600 to adjust the gain, such that the value of the output voltage Vo is adjusted, along the curve Curve8, from the output voltage value Vo4 to the given voltage value Voref1 (i.e., the operating point C is adjusted to the operating point E).

Afterwards, the controller 140h performs the control operation, such that the converter circuit 600 switches from the second inversion mode (the half-bridge converter topology) to the first inversion mode (the full-bridge converter topology). In the operation of switching the inversion mode, under the condition of maintaining the gain value to be the same before and after switching the inversion mode, the controller 140h switches the duty cycle from De (corresponding to the operating point E) to Df (corresponding to the operating point F). After switching the inversion mode, the controller 140h performs the control operation, such that the converter circuit 600 dynamically adjusts the gain along the curve Curve7, such that the value of the output voltage Vo is equal to the given target voltage value Vo3 (corresponding to the operating point A). Accordingly, for the converter circuit 600, the operation of the output voltage Vo switching from having the output voltage value Vo4 to having the given target voltage value Vo3 is completed.

The operations in the embodiments illustrated in FIG. 8B and FIG. 8C are similar to various operations in the embodiments illustrated in FIG. 8A, and thus they are not further detailed herein.

Notably, the full-bridge converter topology and the half-bridge converter topology are not limited to the aforementioned embodiments. The full-bridge converter topology includes phase shift full-bridge converter topology, resonant-type full-bridge converter topology or hard switching full-bridge converter topology. The half-bridge converter topology includes asymmetric half-bridge converter topology, symmetric half-bridge converter topology or resonant-type full-bridge converter topology.

As can be known from the aforementioned embodiments, the converter system can not only adopt the resonant-type converter circuit and operations thereof illustrated in the present disclosure, but also can adopt the PWM-type converter circuit and operations thereof illustrated in the present disclosure, so as to meet various requirements. The converter circuit illustrated in the present disclosure can be switched between the full-bridge converter topology and the half-bridge converter topology, to meet requirements of various output loads, and to satisfy the requirement of significantly increasing efficiency of the entire converter system.

Figure 9:
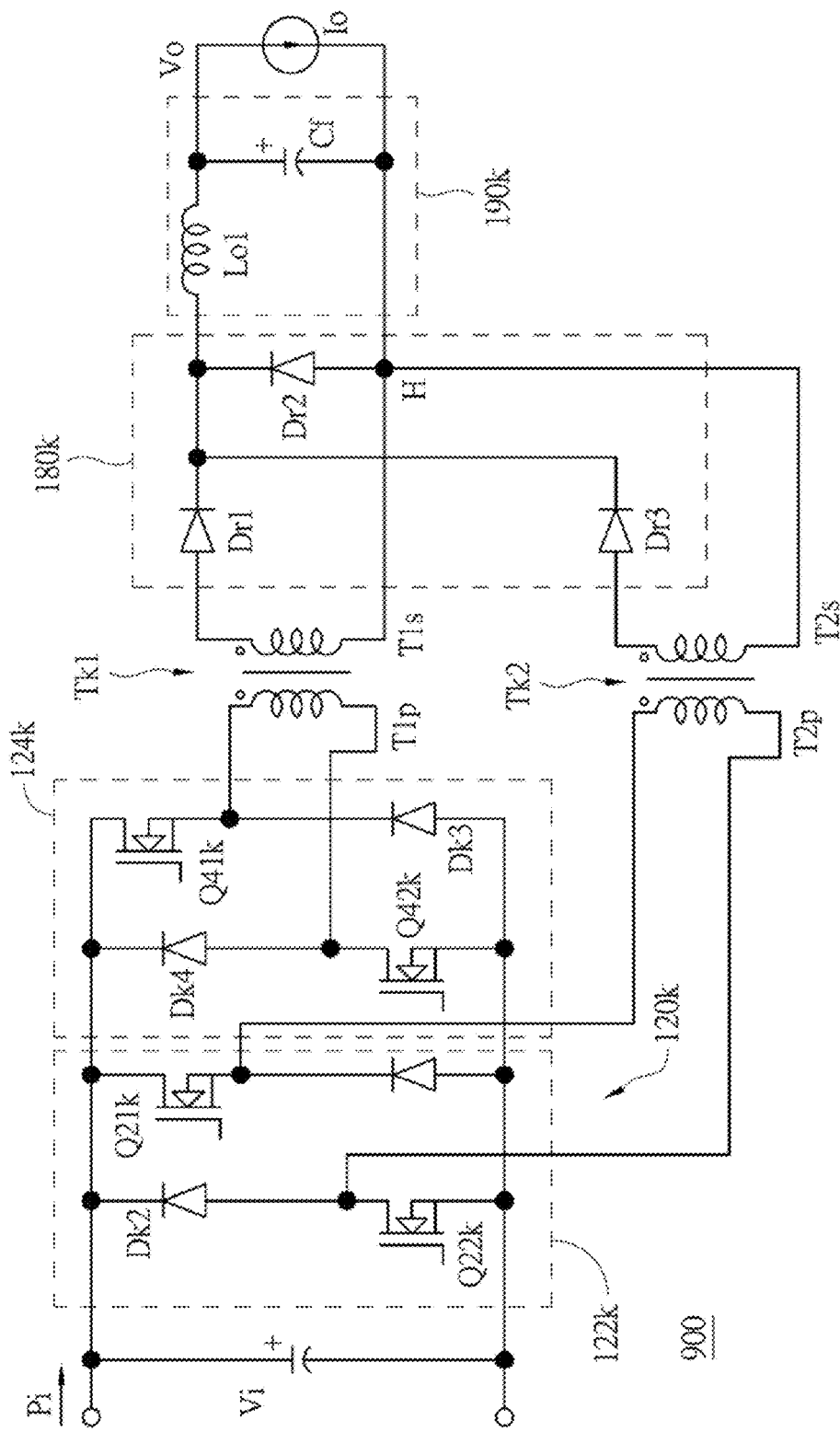
FIG. 9 is a diagram illustrating a converter circuit according to still another embodiment of the present disclosure.

In addition, the PWM-type converter circuit is not limited to the converter circuit 600 (e.g., phase shift full-bridge converter circuit) shown in FIG. 6A, and the PWM-type converter circuit also can be an interleaved forward converting circuit. For illustration in FIG. 9, FIG. 9 is a diagram illustrating a converter circuit according to still another embodiment of the present disclosure. The converter circuit 900 includes an inverter 120k, transformers Tk1 and Tk2, a rectifier 180k, and a filter 190k. The converter circuit 900 further includes a controller which is similar to that illustrated in the aforementioned embodiments, and thus it is not further detailed herein. The inverter 120k includes switch units 122k and 124k. The switch unit 122k is electrically connected to the primary-side winding T2p of the transformer Tk2, and the switch unit 124k is electrically connected to the primary-side winding T1p of the transformer Tk1. The rectifier 180k includes diodes Dr1, Dr2 and Dr3, in which the diode Dr1 is electrically connected to the secondary-side winding T1s of the transformer Tk1, the diode Dr3 is electrically connected to the secondary-side winding T2s of the transformer Tk2, and the diode Dr2 is electrically connected in parallel with the secondary-side winding T1s and the secondary-side winding T2s between the nodes G and H. The filter 190k includes an inductor Lo1 and a capacitor Cf.

In the present embodiment, the switch unit 122k is consisted of two bridge arms, and each of the two bridge arms is consisted of a switch (Q21k or Q22k) and a diode (Dk1 or Dk2) which are connected in series. Similarly, the switch unit 124k is consisted of two bridge arms, and each of the two bridge arms is consisted of a switch (Q41k or Q242k) and a diode (Dk3 or Dk4) which are connected in series. The circuit, which is connected to the secondary-side winding T1s of the transformer Tk1 and the secondary-side winding T2s of the transformer Tk2, is implemented by or included in an interleave-parallel two-switch forward converting circuit which adopts half-wave rectification, such that in the first inversion mode, the controller controls the switches Q21k, Q22k, Q41k, and Q42k to cooperate with each other in the form of the interleaved forward converter, so as to convert the input power Pi. In the second inversion mode, the controller controls the switch Q21k to maintain switched off, and the controller correspondingly controls the switch Q22k to maintain switched off. In the second inversion mode, the controller controls the switches Q21k and Q22k in the form of the single-ended forward converter, so as to convert the input power Pi. Thus, the equivalent duty cycle for the voltage between the nodes G and H is doubled, compared to that in the two-switch forward converter. As a result, the gain of the converter circuit 900 in the first inversion mode (the form of the interleaved forward converter) is two times that of the converter circuit 900 in the second inversion mode (the form of the single-ended forward converter), and the output voltage Vo of the converter circuit 900 in the first inversion mode (the form of the interleaved forward converter) is two times that of the converter circuit 900 in the second inversion mode (the form of the single-ended forward converter). Rest operations of the converter circuit 900 are similar to those in the embodiment illustrated in FIG. 6A, and thus they are not further detailed herein.

Notably, the interleaved forward converter may include interleaved two-switch forward converter topology or interleaved single-switch forward converter topology, and the single-ended forward converter may include two-switch forward converter topology or single-switch forward converter topology.

Figure 10:
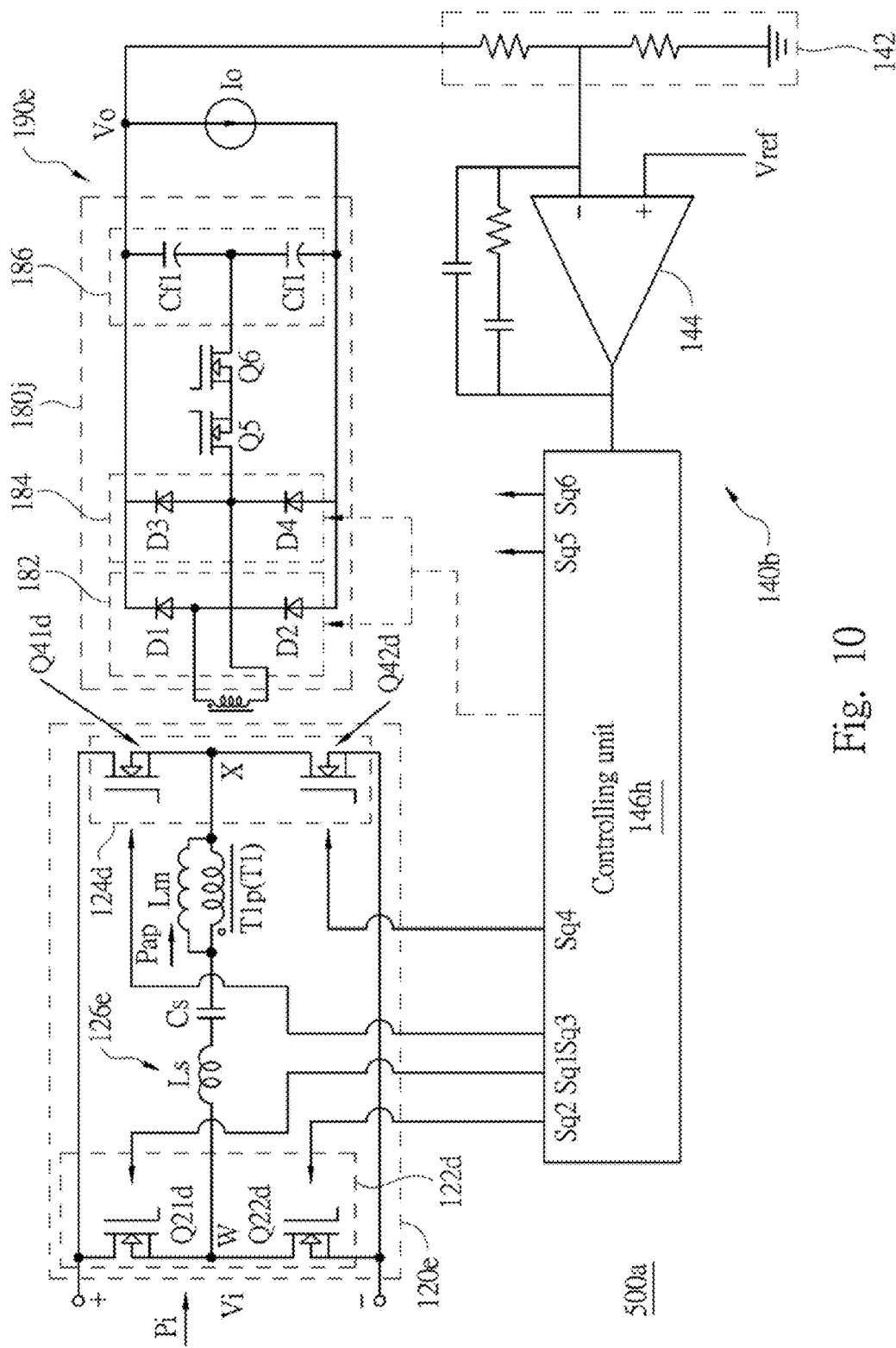
FIG. 10 is a diagram illustrating a converter circuit according to further embodiment of the present disclosure.

FIG. 10 is a diagram illustrating a converter circuit according to further embodiment of the present disclosure. Compared to FIG. 5A, in the converter circuit 500a shown in FIG. 10, the rectifier 180j includes switch units 182 and 184, a capacitor unit 186, and switches Q5 and Q6.

The switch units 182 and 184 are connected in parallel, and each of the switch units 182 and 184 includes a number of switches. In practice, the switches in the switch units 182 and 184 can be implemented by transistor switches or diodes. As shown in FIG. 10, the switch unit 182 includes diodes D1 and D2, and the switch unit 184 includes diodes D3 and D4, in which the diodes D1 and D2 are connected in series to form a first bridge arm, and the diodes D3 and D4 are connected in series to form a second bridge arm.

Moreover, the capacitor unit 186 includes capacitors Cf1 and Cf2 which are connected in series, in which the capacitors Cf1 and Cf2 are connected in series to form a third bridge arm and are connected in parallel with the switch units 182 and 184.

Furthermore, the switches Q5 and Q6 are electrically coupled to the switch unit 184 and the capacitor unit 186. Specifically, the switches Q5 and Q6 are connected in series, an end of the switch Q5 is electrically connected to the switch unit 184, and an end of the switch Q6 is electrically connected to the capacitor unit 186. In detail, the switches Q5 and Q6 are connected in series with each other between a middle node of the first bridge arm in the switch unit 184 and a middle node of the second bridge arm in the capacitor unit 186, and the connections of the switches Q5 and Q6 together with the diodes D3 and D4 and the capacitors Cf1 and Cf2 are illustrated in FIG. 10.

In addition, in the present embodiment, the controlling unit 146h can be configured to output driving signals Sq5 and Sq6 to control the switches Q5 and Q6 to switch on or switch off. In some embodiments, when the switches in the switch units 182 and 184 are implemented by transistor switches, the controlling unit 146h may further be configured to output control signals for controlling the switches in the switch units 182 and 184. As a result, with the switch-on and switch-off of the switches in the switch units 182 and 184 and the switches Q5 and Q6, the rectifier 180j can operate in the first inversion mode or the second inversion mode.

Illustratively, in the converter circuit 500a, the switching of the primary-side topology can be similar to the aforementioned embodiments, and the switching of the secondary-side topology (e.g., the rectifier 180j) can be performed independently or performed together with the switching of the primary-side topology. Specifically, the converter circuit 500a includes an inverter 120e and the rectifier 180j, in which the inverter 120e can operate in the first inversion mode or the second inversion mode. Thus, the operation of the converter circuit 500a may be depended on the combination of the configuration in which the inverter 120e operates and the configuration in which the rectifier 180j operates. In one embodiment, the operation of the converter circuit 500a corresponds to the inverter 120e in the first inversion mode and the rectifier 180j in the first rectification mode. In another embodiment, the operation of the converter circuit 500a corresponds to the inverter 120e in the first inversion mode and the rectifier 180j in the second rectification mode. In still another embodiment, the operation of the converter circuit 500a corresponds to the inverter 120e in the second inversion mode and the rectifier 180j in the second rectification mode.

As is understood by one of ordinary skill in the art, in the aforementioned embodiments, the inversion mode and the rectification mode corresponding to the operation of the converter circuit 500a are given for illustrative purposes, but are not limiting of the present disclosure. For example, in other alternative embodiments, the circuit topology of the inverter only corresponds to the first inversion mode, and the circuit topology of the rectifier may correspond to the first or second rectification mode. As a result, the variation of the output of the converter circuit is merely depended on the configuration of the rectifier; that is, the operation of the converter circuit corresponds to the inverter in the first inversion mode and the rectifier in the first rectification mode, or the operation of the converter circuit corresponds to the inverter in the first inversion mode and the rectifier in the second rectification mode. The switching operations of the rectifier 180j are specifically described below.

In the first rectification mode, the controlling unit 146h is configured to control the switches Q5 and Q6 to switch on. At the moment, in the rectifier 180j, a half-bridge circuit (e.g., a voltage doubling rectifying circuit consisted of the switch unit 182 and the capacitor unit 186) performs the main operation. Thus, the rectifier 180j can perform the voltage doubling rectifying operation to the secondary-side AC voltage through the switch unit 182 and the capacitor unit 186. In operation, when the output of the secondary-side circuit in the converter circuit 500a is positive, the current flows through the diode D1, the capacitor Cf1 and the switches Q5 and Q6. On the other hand, when the output of the secondary-side circuit in the converter circuit 500a is negative, the current flows through the diode D2, the capacitor Cf2 and the switches Q5 and Q6.

In the second rectification mode, the controlling unit 146h is configured to control the switches Q5 and Q6 to switch off. At the moment, in the rectifier 180j, a full-bridge circuit (e.g., a full-bridge rectifying circuit consisted of the diodes D1-D4) performs the main operation. Thus, the rectifier 180j can perform the full-bridge rectifying operation to the secondary-side AC voltage (i.e., the output of the transformer T1) through the switch unit 182 and 184, and then the rectified voltage is filtered by the capacitor unit 186, so as to provide the output voltage Vo for the load.

In one embodiment, the inverter 120e in the converter circuit 500a may further include another switch unit (e.g., the switch unit 124 shown in FIG. 1) in addition to the switch unit 122d. The controlling unit 146h is configured to control switches of each of the two switch units to switch on or switch off, such that the inverter 120e operates in the first inversion mode or the second inversion mode. Specific operations are described as mentioned above, and thus they are not further detailed herein.

In another embodiment, when the inverter 120e operates in the first inversion mode, the controlling unit 146h controls the switches of the two switch units in the inverter 120e to cooperatively switch on and switch off periodically, according to the output voltage corresponding to the primary-side AC voltage. When the inverter 120e operates in the second inversion mode, the controlling unit 146h controls one of the two switch units in the inverter 120e to operate independently, such that the switches therein switch on and switch off periodically, and the ratios of the output voltage Vo relative to of the input voltage Vi of the converter circuit 500a in the first inversion mode and the second inversion mode are different.

In still another embodiment, the converter circuit 500a similarly includes the resonant circuit and the magnetizing inductor, and their circuit structures, connections and operations are similar to the resonant circuit and the magnetizing inductor in the converter circuit 500, and thus they are not further detailed herein.

As can be known from the aforementioned embodiments, the converter circuit can be the resonant-type converter circuit or the PWM-type converter circuit, and can be switched between different converter topologies, to meet requirements of various output loads, and to satisfy the requirement of significantly increasing efficiency of the entire converter system.

Another aspect of the present disclosure is related to a method of converting power by a converter circuit. The method can be applied in the converter circuit 100e illustrated in FIG. 1E, but it is not limited thereto. The method of converting power is described below with reference to the converter circuit 100e in FIG. 1E and the operations in FIG. 2. The converter circuit 100e includes the switch units 122d and 124d, and the switch units 122d and 124d includes the switches Q21d, Q22d, Q41d, and Q42d. The method of converting power includes the following operations. The switch unit 122d and the switch unit 124d perform operations corresponding to the first inversion mode or the second inversion mode, such that the converter circuit 100e converts the input power Pi into the output power Po, in which when the converter circuit 100e is operated in the first inversion mode, the switches of the switch unit 122d and the switch unit 124d cooperatively switch on and switch off periodically, and when the converter circuit 100e is operated in the second inversion mode, the switch unit 122d operates independently and the switches Q21d and Q22d switch on and switch off periodically. Then, the gain associated with the output power Po and the input power Pi is adjusted, such that the value of the output voltage Vo corresponding to the input power Pi is adjusted to approach or be equal to the given voltage value Voref1 (Step 203) (the detailed descriptions are made as the embodiments illustrated in FIGS. 3A-3C and FIGS. 4A-4C). Afterwards, the first inversion mode is switched to the second inversion mode, or the second inversion mode is switched to the first inversion mode (Step S204), such that the switch unit 122d and the switch unit 124d perform operations corresponding to the first inversion mode or the second inversion mode, and the output power Po corresponding to the output voltage Vo approaches or is equal to the given target voltage value (e.g., the given target voltage value Vo2 illustrated in FIGS. 3A-3C, or the given target voltage value Vo3 illustrated in FIGS. 4A-4C).

As shown in FIG. 1E and FIG. 2, in one embodiment, the method of converting power includes the following operation (Step S202). Before switching the corresponding inversion mode and adjusting the gain associated with the output power Po and the input power Pi, whether the value of the output voltage Vo corresponding to the output power Po is equal to the given voltage value Voref1 is determined.

As shown in FIG. 1E and FIG. 2, in one embodiment, the operation of adjusting the gain (Step S203) is performed after determining that the value of the output voltage Vo corresponding to the output power Po is not equal to the given voltage value Voref1, such that the value of the output voltage Vo corresponding to the output power Po is equal to the given voltage value Voref1.

As shown in FIG. 1E and FIG. 2, in one embodiment, the method of converting power includes the following operation (Step S205). After switching the corresponding inversion mode, whether the value of the output voltage Vo corresponding to the output power Po is equal to the given target voltage value (e.g., the given target voltage value Vo2 illustrated in FIGS. 3A-3C, or the given target voltage value Vo3 illustrated in FIGS. 4A-4C) is determined.

As shown in FIG. 1E and FIG. 2, in one embodiment, the method of converting power includes the following operation (Step S206). After determining that the value of the output voltage Vo corresponding to the output power Po is not equal to the given target voltage value, the gain associated with the output power Po and the input power Pi is adjusted until the value of the output voltage Vo corresponding to the output power Po is not equal to the given target voltage value.

As shown in FIG. 1E and FIG. 2, in one embodiment, the method of converting power includes the following operation (Step S201). Before switching the corresponding inversion mode, whether a command of changing the output power Po is received or whether the output power Po is smaller than a reference power is determined, in which the reference power is a given power predetermined by the controller 140e.

Notably, the operation of adjusting the gain (Step S203 or Step S206) may further include the operation of adjusting an operating frequency of at least one of the switch units 122d and 124d.

As shown in FIG. 1E and FIG. 2, in one embodiment, the operation of adjusting the gain (Step S203) further includes the operation of deactivating a driving operation of the inverter 120e, and the operation of performing discharging through the output capacitor Cf to decrease the gain associated with the output power Po and the input power Pi. Specific operations are similar to the embodiments describing the operations of gain variations illustrated in FIGS. 3A-3C applied in the converter circuit 100e, and thus they are not further detailed herein.

As shown in FIG. 1E and FIG. 2, in one embodiment, the operation of switching the inversion mode (Step S204) further includes the following operations. Under the condition of maintaining the gain associated with the output power Po and the input power Pi the same before and after switching the inversion mode, switching the operating frequency of at least one of the switch units 122d and 124d. For example, in the operations of gain variations illustrated in FIG. 3A-3C applied in the converter circuit 100e, the gain is maintained the same during the process of the operating point B switched to the operating point C. Specific operations are similar to the embodiments describing the operations of gain variations illustrated in FIGS. 3A-3C applied in the converter circuit 100e, and thus they are not further detailed herein.

As shown in FIG. 1E and FIG. 2, in one embodiment, the given voltage value Voref1 is set to approach or be equal to the given target voltage value (e.g., the given target voltage value Vo2 illustrated in FIGS. 3A-3C, or the given target voltage value Vo3 illustrated in FIGS. 4A-4C). Specifically, the controller 140e presets a range (e.g., the range between the operating points B1 and B2 shown in FIG. 3A), and the given voltage value Voref1 is set corresponding to the operating point located within the range. Specific operations are similar to the embodiments describing the operations of gain variations illustrated in FIGS. 3A-3C applied in the converter circuit 100e, and thus they are not further detailed herein.

As shown in FIG. 1E and FIG. 2, in one embodiment, the operation of switching the inversion mode (Step S204) further includes the following operations. When the inversion mode is switched, the operating frequency of the switches (the switches Q21d and Q22d, or the switches Q41d and Q42d) of at least one of the switch units 122d and 124d is maintained. For example, in the operations of gain variations illustrated in FIG. 3A-3C applied in the converter circuit 100e, the operating frequency is maintained the same during the process of the operating point A switched to the operating point G. Specific operations are similar to the embodiments describing the operations of gain variations illustrated in FIGS. 3A-3C applied in the converter circuit 100e, and thus they are not further detailed herein.

As shown in FIG. 1E and FIG. 2, in one embodiment, under the condition of the value of the output voltage Vo corresponding to the output power Po being equal to the given target voltage value (e.g., the given target voltage value Vo2 illustrated in FIGS. 3A-3C), the output voltage Vo corresponds to two times the value of the gain, and the given voltage value Voref1 is set to approach or be equal to the value of the output voltage Vo corresponding to two times the value of the gain. For example, in the embodiments describing the operations of gain variations illustrated in FIG. 3A-3C applied in the converter circuit 100e, the operating point D corresponds to the operating point at which the value of the output voltage Vo is equal to the given voltage value Voref1, in which the gain value is Gain2 under the condition of the value of the output voltage Vo equal to the given target voltage value Vo2, and the gain value corresponding to the operating point D is two times Gain2, i.e., 2×Gain2. Specific operations are similar to the embodiments describing the operations of gain variations illustrated in FIGS. 3A-3C applied in the converter circuit 100e, and thus they are not further detailed herein.

As shown in FIG. 1E and FIG. 2, in one embodiment, the operation of switching the inversion mode (Step S204) further includes the following operations. When the inversion mode is switched, the operating frequency of the switches of at least one of the switch units 122d and 124d is synchronously adjusted, such that the value of the output voltage Vo corresponding to the output power Po equal to the given target voltage value. For example, in the embodiments describing the operations of gain variations illustrated in FIG. 4A applied in the converter circuit 100e, switching the operation of the converter circuit 100e can be completed through switching the operation between the operating point A and the operating point C, and the operating frequency is adjusted synchronously during the switching process. Specific operations are similar to the embodiments describing the operations of gain variations illustrated in FIGS. 4A-4C applied in the converter circuit 100e, and thus they are not further detailed herein.

Therefore, as can be known from the aforementioned embodiments, the method of converting power in the present disclosure can be applied to control the switches in the converter circuit to switch between different converter topologies, so as to increase the efficiency of the entire converter system.

In addition, the method of converting power in the present disclosure also can be applied in the PWM-type converter circuit, for example, the converter circuit 600 in FIG. 6A. Notably, in the method of converting power applied in the converter circuit, the operation of adjusting the gain can be realized by adjusting the duty cycle of the switches of at least one of the switch unit 122h and the switch unit 124h. Specific operations are similar to the embodiments describing the operations of gain variations illustrated in FIGS. 7A-7C or FIGS. 8A-8C applied in the converter circuit 100e, and thus they are not further detailed herein.

The advantages for the embodiments of the present disclosure are described as below. The converter system can not only adopt the resonant-type converter circuit and operations thereof illustrated in the present disclosure, but also can adopt the PWM-type converter circuit and operations thereof illustrated in the present disclosure, so as to meet various requirements. The converter circuit and the method of converting power illustrated in the present disclosure can be applied to switch between the full-bridge converter topology and the half-bridge converter topology, to meet requirements of various output loads, and to satisfy the requirement of significantly increasing efficiency of the entire converter system.

In addition, the converter circuit in the present disclosure also can be applied to switch between the interleaved converter topology and the single-ended converter topology, to satisfy the requirements of various applications.

The steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A converter circuit comprising:
an inverter configured to receive an input voltage, and convert the input voltage into a primary-side alternating-current (AC) voltage, the inverter comprising:
a first switch unit having a plurality of switches;
a second switch unit having a plurality of switches; and
a controller, wherein when the converter circuit works in a first inversion mode, the controller is configured to control the plurality of switches of the first switch unit and the second switch unit to cooperatively switch on and switch off periodically according to an output voltage of the converter circuit, and when the converter circuit works in a second inversion mode, the controller is configured to control the first switch unit to operate independently and the plurality of switches of the first switch unit switch on and switch off periodically;
wherein the converter circuit has different voltage gains in the first inversion mode and in the second inversion mode,
wherein after the controller receives a signal associated with an output state of the converter circuit being changed:
the controller adjusts a gain associated with the output voltage and the input voltage to a first gain value to change the output voltage from a first voltage to a second voltage, and after the gain is adjusted, the controller switches an inversion mode of the converter circuit from the first inversion mode to the second inversion mode to change the output voltage from the second voltage to a target voltage, or
the controller switches the inversion mode of the converter circuit from the second inversion mode to the first inversion mode to change the output voltage from the first voltage to the second voltage, and after the controller switches the inversion mode of the converter circuit, the gain is adjusted to change the output voltage from the second voltage to the target voltage.

2. The converter circuit as claimed in claim 1, further comprising:
a transformer having a primary-side winding and a secondary-side winding, which is configured to convert the primary-side AC voltage into a secondary-side AC voltage; and a rectifier configured to rectify the secondary-side AC voltage into a direct-current (DC) voltage so as to generate the output voltage corresponding to the DC voltage;

wherein the controller is further configured to control an operating frequency or a duty cycle of at least one of the plurality of switches of the first switch unit and the second switch unit, so as to adjust the gain associated with the output voltage and the input voltage.

3. The converter circuit as claimed in claim 2, further comprising:

a filter electrically coupled to the rectifier, which is configured to stabilize the DC voltage so as to output the output voltage.

4. The converter circuit as claimed in claim 1, wherein the second switch unit comprises a first switch and a second switch, wherein in the second inversion mode, the controller is configured to control the first switch to maintain switched on or switched off, and configured to correspondingly control the second switch to maintain switched on or switched off.

5. The converter circuit as claimed in claim 4, wherein the first switch unit comprises a third switch and a fourth switch, wherein in the second inversion mode, the controller is configured to control the third switch and the fourth switch to convert the input voltage by a half-bridge converter topology or a single-ended forward converter topology.

6. The converter circuit as claimed in claim 4, wherein the first switch unit comprises a third switch and a fourth switch, and the controller comprises:

a sampler configured to sample the output voltage to generate a sampling voltage; and an operational amplifier configured to compare the sampling voltage with a first reference voltage or compare the sampling voltage with a second reference voltage, to control at least one of the first switch, the second switch, the third switch, and the fourth switch.

7. The converter circuit as claimed in claim 1, wherein the first switch unit comprises a third switch and a fourth switch, the second switch unit comprises a first switch and a second switch;

wherein in the first inversion mode, the controller is configured to control the first switch, the second switch, the third switch and the fourth switch to cooperate with each other to convert the input voltage by a full-bridge converter topology or an interleaved forward converter topology.

8. The converter circuit as claimed in claim 1, wherein after the gain is adjusted, the controller switches the inversion mode of the converter circuit from the first inversion mode to the second inversion mode to change the output voltage from the second voltage to the target voltage further comprising to maintain the first gain value before and after the inversion mode being switched and to change an operation frequency of the first switch unit to change the output voltage from the second voltage to the target voltage.

9. The converter circuit as claimed in claim 1, wherein after the gain is adjusted, the controller switches the inversion mode of the converter circuit from the first inversion mode to the second inversion mode to change the output voltage from the second voltage to a given voltage further comprising to maintain the first gain value before and after the inversion mode being switched and to change an operation frequency of the first switch unit to change the output voltage from the second voltage to a third voltage, and then to adjust the first gain value to change the output voltage from the third voltage to the target voltage.

10. The converter circuit as claimed in claim 1, wherein after the controller receives the signal associated with an output state of the convert circuit being changed, the controller switches the inversion mode of the converter circuit from the second inversion mode to the first inversion mode to change the output voltage from the first voltage to the second voltage, further comprising to maintain a gain value before and after the inversion mode being switched and to change an operation frequency of the first switch unit and the second switch unit to change the output voltage from the first voltage to the second voltage.

11. The converter circuit as claimed in claim 1, wherein after the controller receives the signal associated with an output state of the convert circuit being changed, the controller switches the inversion mode of the converter circuit from the second inversion mode to the first inversion mode to change the output voltage from the first voltage to the second voltage, further comprising to adjust the gain to change the output voltage from the first voltage to a third voltage, and then to maintain the gain value before and after the inversion mode being switched and to change an operation frequency of the first switch unit and the second switch unit to change the output voltage from the third voltage to the second voltage.

12. A method of converting power by a converter circuit, the converter circuit comprising an inverter, the inverter comprising a first switch unit and a second switch unit, each of the first switch unit and the second switch unit comprising a plurality of switches, the method comprising:

the first switch unit and the second switch unit performing operations according to a first inversion mode or a second inversion mode of the converter circuit, such that the converter circuit converts an input voltage into an output voltage, wherein when the converter circuit works in the first inversion mode, switches of the first switch unit and the second switch unit cooperatively switch on and switch off periodically, and when the converter circuit works in the second inversion mode, the first switch unit operates independently and the plurality of switches of the first switch unit switch on and switch off periodically;

receiving a signal associated with an output state of the convert circuit being changed, further comprising the following step (i) or step (ii):

(i) adjusting a gain associated with the output voltage and the input voltage, such that a voltage value corresponding to the output voltage is changed to approach or be equal to a first given voltage value; and switching an operation from the first inversion mode to the second inversion mode after the gain is adjusted, such that the first switch unit and the second switch unit perform operations corresponding to the second inversion mode, and the voltage value corresponding to the output voltage approaches or is equal to a second given voltage value, wherein the first given voltage value is set to approach or be equal to the second given voltage value;

(ii) switching the operation from the second inversion mode to the first inversion mode such that the voltage value corresponding to the output voltage is changed to approach or be equal to a first given voltage value, and after switching the operation from the second inversion mode to the first inversion mode, adjusting the gain associated with the output voltage and the input voltage such that the voltage value corresponding to the output voltage approaches or is equal to the second given voltage value.

13. The method as claimed in claim 12, further comprising:
before switching the operation between the first inversion mode and the second inversion mode, and adjusting the gain associated with the output voltage and the input voltage, determining whether the voltage value corresponding to the output voltage is equal to the first given voltage value.

14. The method as claimed in claim 12, further comprising:
after switching the operation between the first inversion mode and the second inversion mode, determining whether the voltage value corresponding to the output voltage is equal to the second given voltage value.

15. The method as claimed in claim 12, wherein adjusting the gain associated with the output voltage and the input voltage further comprises:
adjusting an operating frequency or the duty cycle of the plurality of switches of at least one of the first switch unit and the second switch unit.

16. The method as claimed in claim 12, wherein adjusting the gain associated with the output voltage and the input voltage further comprises:
deactivating a driving operation of the inverter, and performing discharging through an output capacitor to decrease the gain associated with the output voltage and the input voltage.

17. The method as claimed in claim 12, further comprising:
before switching the operation between the first inversion mode and the second inversion mode, determining whether a command of changing the output voltage is received or whether the output voltage is smaller than a reference voltage.

18. The method as claimed in claim 12, wherein switching the corresponding inversion mode further comprises:
in a condition of maintaining the gain associated with the output voltage and the input voltage before and after switching the operation between the first inversion mode and the second inversion mode, switching an operating frequency or a duty cycle of at least one of the first switch unit and the second switch unit.

19. The method as claimed in claim 12, wherein switching the corresponding inversion mode further comprises:
when the operation between the first inversion mode and the second inversion mode is switched, keeping an operating frequency or a duty cycle of the plurality of switches of at least one of the first switch unit and the second switch unit.

20. The method as claimed in claim 12, wherein switching the inversion mode further comprises:
when the operation between the first inversion mode and the second inversion mode is switched, synchronously adjusting an operating frequency or a duty cycle of the plurality of switches of at least one of the first switch unit and the second switch unit, such that the voltage value corresponding to the output voltage is equal to the second given voltage value.

21. The method as claimed in claim 12, wherein switching the operation from the first inversion mode to the second inversion mode after the gain is adjusted further comprising to maintain a gain value before and after the inversion mode being switched and to change an operation frequency of the first switch unit to change the first given voltage value to the second given voltage value.

22. The method as claimed in claim 12, wherein switching the operation from the first inversion mode to the second inversion mode after the gain is adjusted further comprising to maintain a gain value before and after the inversion mode being switched and to change an operation frequency of the first switch unit to change the first given voltage value to a third voltage, and then to adjust the gain to change the third voltage to the second given voltage value.

23. The method as claimed in claim 12, wherein switching the operation from the second inversion mode to the first inversion mode such that the voltage value corresponding to the output voltage is changed to approach or be equal to the first given voltage value further comprising to maintain a gain value before and after the inversion mode being switched and to change an operation frequency of the first switch unit and the second switch unit to change the output voltage to approach or be equal to the first given voltage value.

24. The method as claimed in claim 12, wherein switching the operation from the second inversion mode to the first inversion mode such that the voltage value corresponding to the output voltage is changed to approach or be equal to the first given voltage value further comprising to adjust the gain to change the output voltage to a third voltage, and then to maintain a gain value before and after the inversion mode being switched and to change an operation frequency of the first switch unit and the second switch unit to change the third voltage to approach or be equal to the first given voltage value.

* * * * *